US012634750B2

(12) United States Patent
    Xin et al.

(10) Patent No.:    US 12,634,750 B2
(45) Date of Patent:        May 19, 2026

(54) ERROR PROTECTION OF DATA UNIT SERVICE FIELD IN WIRELESS LOCAL AREA NETWORK TRANSMISSIONS

(71) Applicants:Yan Xin, Ottawa (CA); Junghoon Suh, Ottawa (CA); Osama Aboul-Magd, Ottawa (CA); Sheng Sun, Ottawa (CA); Kwok Shum Au, Ottawa (CA)

(72) Inventors: Yan Xin, Ottawa (CA); Junghoon Suh, Ottawa (CA); Osama Aboul-Magd, Ottawa (CA); Sheng Sun, Ottawa (CA); Kwok Shum Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 520 days.

(21) Appl. No.: 17/862,309

(22) Filed: Jul. 11, 2022

(65) Prior Publication Data

US 2023/0021206 A1     Jan. 19, 2023

Related U.S. Application Data

(60) Provisional application No. 63/223,536, filed on Jul. 19, 2021.

(51) Int. Cl.
    *H04W 28/04*        (2009.01)
    *H04L 1/00*          (2006.01)
                (Continued)

(52) U.S. Cl.
    CPC ........... *H04W 28/04* (2013.01); *H04L 1/0063* (2013.01); *H04L 1/0069* (2013.01); *H04L 25/03866* (2013.01); *H04W 84/12* (2013.01)

(58) Field of Classification Search
    CPC ..... H04B 7/088; H04B 17/328; H04W 28/04; H04W 84/12; H04L 1/0063; H04L 1/0069; H04L 25/03866
    See application file for complete search history.

(56) References Cited

U.S. PATENT DOCUMENTS 7,062,703 B1    6/2006  Keaney et al.
2004/0128589 A1*  7/2004  Lewis ................... H04L 1/0041
                                                      714/700
            (Continued)

FOREIGN PATENT DOCUMENTS

CN          111937447 A      11/2020
WO        2004006509 A1      1/2004
WO        2020197488 A1      10/2020

OTHER PUBLICATIONS

IEEE 802.11-20/1494r2 Date: Sep. 15, 2020 IEEE 802.11 WLAN Proposed Draft Text: EHT PHY Data scrambler and descrambler Author: Chenchen Liu Affiliation: Huawei (Year: 2020).*
            (Continued)

*Primary Examiner* — Kevin T Bates
*Assistant Examiner* — Jaeyoung Kwak

(57)        ABSTRACT
Transmitting or receiving an RF signal that carries a data unit, the data unit comprising a DATA field that includes a SERVICE field, the SERVICE field including a scrambler initialization field and a sequence of remaining bits scrambled based on a set of scrambler sequence initialization bits included in the scrambler initialization field, the SERVICE field containing a first set of one or more error detection bits that has been computed to enable error detection for at least a first group of bits included in the scrambler initialization field.

20 Claims, 16 Drawing Sheets

(51) Int. Cl.
  H04L 25/03 (2006.01)
  H04W 84/12 (2009.01)

(56) References Cited

U.S. PATENT DOCUMENTS

| | | | |
|---|---|---|---|
| 2012/0195302 A1 | 8/2012 | Park et al. | |
| 2013/0155953 A1 | 6/2013 | Chu et al. | |
| 2014/0003415 A1* | 1/2014 | Asterjadhi | H04L 1/0061 |
| | | | 370/349 |
| 2014/0119327 A1* | 5/2014 | Oh | H04L 1/08 |
| | | | 370/329 |
| 2014/0334476 A1* | 11/2014 | Cheong | H04W 28/065 |
| | | | 370/338 |
| 2017/0171888 A1 | 6/2017 | Itagaki et al. | |
| 2017/0289987 A1* | 10/2017 | Seok | H04W 74/00 |
| 2022/0247515 A1* | 8/2022 | Hart | H04L 1/0068 |

OTHER PUBLICATIONS

Chenchen Liu, "EHY PHY Data scrambler and descrambler", IEEE 802. 11-20/1494r2, Sep. 15, 2020 (Year: 2020).*
Chenchen Liu, "EHY PHY Data scrambler and descrambler", doc.: IEEE 802.11-20/1494r2, IEEE P802.11 Wireless LANs, Sep. 2020 (Year: 2020).*
IEEE Std 802.11-2020 2020.
IEEE Std 802.11ax-2021 2021.
IEEE Draft P802.11be_D1.0 May 2021.
B. Hart, IEEE 802.11-21/247r4, Protecting CH_BANDWIDTH_IN_NOT_HT (etc) in Service field. Jun. 20, 2021.

* cited by examiner

ERROR PROTECTION OF DATA UNIT SERVICE FIELD IN WIRELESS LOCAL AREA NETWORK TRANSMISSIONS

RELATED APPLICATIONS

The present application claims benefit of and priority to United States Provisional Patent Application Ser. No. 63/223,536 filed Jul. 19, 2021, the contents of which are incorporated herein by reference.

FIELD

The present application relates to methods and systems for wireless network communications, and, more particularly, error protection of a service field in a data unit used for wireless local area network transmissions

BACKGROUND

The Institute of Electrical and Electronics Engineers (IEEE) 802.11 is a group of media access control (MAC) and physical layer (PHY) specification standards for implementing wireless local area network (WLAN) communication in the unlicensed frequency bands. The 802.11 is a family of Wireless LAN working group standards. These standards have experienced steady development and are projected for continued growth to meet the ever-increasing demand for enhanced throughput, reduced latency and jitter, higher reliability, and improved power efficiency driven by new and emerging applications, including virtual or augmented reality, immersive gaming, remote office and cloud computing.

A new protocol, IEEE 802.11be™, is currently under development by the IEEE 802.11™ Task Group TGbe and will be the next major IEEE 802.11™ amendment to define the next generation of Wi-Fi after IEEE 802.11ax™. IEEE 802.11be™ (also called Extremely High Throughput (EHT)) is expected to support a data rate of at least 30 Gbps and may use a spectrum bandwidth up to 320 MHz for unlicensed operations, double the 160 MHz maximum bandwidth currently contemplated by IEEE 802.11ax. The improved capabilities of the 802.11be may at least in part be attributed to the release of the 6 GHz frequency band for unlicensed use.

The physical layer (PHY) of 802.11™ contains a Physical Layer Convergence Protocol (PLCP) sublayer. PCLP prepares a well-structured packet allowing a decodable communication between a transmitter and a receiver. The packet, for example a PLCP protocol data unit (PPDU), consists of multiple fields, including preamble fields and payload. The PPDU is used for transmission in PHY to carry data from upper layers. The DATA field in a PPDU includes a SERVICE field, Physical Layer Convergence Protocol (PLCP) Service Data Unit (PSDU) (i.e., MAC protocol data units (MPDU)), PPDU Tail field (for termination of block convolutional code (BCC) state if BCC is used) and pad bits. To increase the randomness of PPDU transmission, the DATA field content is scrambled by a scrambler before Block Convolutional Code (BCC) or Low density parity check (LDPC) encoding at transmitter (Tx) with a scrambler state initialized by Initialization bits in the scrambling sequence in a pseudorandom fashion. The SERVICE field specified at the beginning of a DATA field at a transmitter (Tx) device allows a descrambler at a receiver (Rx) device to synchronize the scrambler state with the same scrambler used at Tx device in order to recover the DATA field through descrambling.

For compatibility with legacy devices, the 802.11a PPDU format, called non-HT PPDU or non-HT duplicate PPDU format, continues to be used in High throughput (HT) (i.e., 802.11n), Very High Throughput (VHT) (i.e., 802.11ac) and High Efficiency (HE) (i.e., 802.11ax) and Extremely High Throughput (EHT) (i.e., 802.11be) for transmission of a control fame.

For non-HT or non-HT duplicate PPDU transmission in 802.11n, 802.11ac, 802.11ax and 802.11be, the channel bandwidth settings of a transmitted PPDU (e.g., 20 MHz, 40 MHz, 80 MHz, 160 MHz or 80+80 MHz, and CH_BANDWIDTH_IN_NON_HT) is signaled through SERVICE field bits B5 and B6, in the first 7 bits of the scrambling sequence. The dynamic channel bandwidth setting, DYN_BANDWIDTH_IN_NON_HT, is signaled through SERVICE field bit B4, in the first 7 bits of the scrambling sequence. In particular the corresponding pseudorandom bits of the scrambling sequence are replaced with the appropriate signaling bits. Furthermore, the channel bandwidth signaling for a transmitted PPDU of 320 MHz and preamble puncturing index are signaled with several bits starting from bit B7 in the SERVICE field.

In 802.11be, a new scrambler is specified for EHT PPDU format, which has a higher degree of scrambler polynomial that needs 11 Initialization bits.

However, for all 802.11 PPDU formats there is no error detection method in PHY specified for DATA field including SERVICE field. As set out in IEEE 802.11-2020, the validity of parameter CH_BANDWIDTH_IN_NON_HT carried in scrambling sequence is determined at the Medium Access Control (MAC) layer through error detection of the received MPDU.

A method for error detection of channel bandwidth of transmitted PPDU of 320 MHz and preamble puncturing index signaled with SERVICE bits has been proposed in which error detection bits are calculated and carried in SERVICE field before scrambling. In that proposal, due to the limited number of SERVICE field bits (maximum 3 bits) available to be used for error protection of the remaining SERVICE field bits (which includes the PPDU bandwidth of 320 MHz signaling bit and preamble puncturing index signaling bits) one bit of error can be detected. This can be problematic because an error in the decoded scrambled Scrambler initialization bits at an Rx device can cause an incorrect initial state of the Rx device descrambler and an incorrect descrambling sequence that yields more than one error when descrambling the signaling carried in SERVICE field.

Accordingly, there is a need for systems and methods for error detection and protection of a SERVICE field in a data unit used for wireless local area network transmissions.

SUMMARY

Example embodiments of the present disclosure are directed to providing error protection for the SERVICE field of a data unit such as an EHT PPDU.

According to a first aspect is a method for transmitting data in a wireless local area network (WLAN), comprising: transmitting, in the WLAN, from a first wireless communication device, an RF signal that carries a data unit, the data unit comprising a DATA field that includes a SERVICE field, the SERVICE field including a scrambler initialization field and a sequence of remaining bits scrambled based on a set of scrambler sequence initialization bits included in the scrambler initialization field, the SERVICE field containing a first set of one or more error detection bits that has been computed to enable error detection for at least a first group of bits included in the scrambler initialization field.

According to an example of the first aspect, the first set of one or more error detection bits are included in the sequence of scrambler sequence initialization bits.

According to one or more of the preceding examples, prior to transmitting the RF signal, computing the first set of one or more error detection bits and then scrambling the bits included in the sequence of remaining bits based on the scrambler sequence initialization bits.

According to one or more of the preceding examples, the sequence of remaining bits comprises a second set of one or more error detection bits that have been computed to enable error detection for a second group of bits that are included in the sequence of remaining bits.

According to one or more of the preceding examples, the first set of one or more error detection bits are included in the sequence of remaining bits.

According to one or more of the preceding examples, the method includes, prior to transmitting the RF signal, computing the first set of one or more error detection bits based on further bits included in the SERVICE field in addition to the first group of bits.

According to one or more of the preceding examples, the further bits include signaling bits that indicate channel bandwidth information.

According to one or more of the preceding examples, the further bits include signaling bits that indicate a puncturing pattern.

According to one or more of the preceding examples, the further bits include signaling bits that are located within the scrambler initialization field following the first group of bits.

According to one or more of the preceding examples, the further bits include signaling bits that are located within the sequence of remaining bits of the SERVICE field.

According to one or more of the preceding examples, the SERVICE field is 16 bits, the scrambler initialization field is 7 bits and the sequence of remaining bits is 9 bits.

According to one or more of the preceding examples, the data unit is a Non-High-Throughput physical layer (PHY) protocol data unit (PPDU).

According to one or more of the preceding examples, the SERVICE field is 16 bits, the scrambler initialization field is 11 bits and the sequence of remaining bits is 5 bits.

According to one or more of the preceding examples, the data unit is an Extremely-High-Throughput PPDU.

According to one or more of the preceding examples, the first set of one or more error detection bits is a set of error detection bits that provide a cyclic redundancy check (CRC) value.

According to one or more of the preceding examples, the first set one or more error detection bits is a single parity check value.

According to one or more of the preceding examples, the first group of bits are pseudorandom bits that are applied to initialize a polynomial scrambler function that scrambles all bits in the DATA field following the sequence of unscrambled scrambler initialization bits.

According to one or more of the preceding examples, the first set of one or more error detection bits includes a set of error detection and correction bits that have been computed to enable error detection and correction for at least the first group of bits included in the scrambler initialization field.

According to a first aspect is a method for receiving data in a wireless local area network (WLAN), comprising: receiving, in the WLAN, at a wireless communication device, an RF signal that carries a data unit, the data unit comprising a DATA field that includes a SERVICE field, the SERVICE field including a scrambler initialization field and a sequence of remaining bits scrambled based on a set of scrambler sequence initialization bits included in the scrambler initialization field, the SERVICE field containing a first set of one or more error detection bits that has been computed to enable error detection for at least a first group of bits included in the scrambler initialization field.

According to example aspects, wireless communication devices are disclosed that are configured to perform the methods of one or more of the above aspects.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Example embodiments are disclosed that enable error protection for a SERVICE field of a data unit such as a PPDU that is used wireless network communications.

Figure 1:
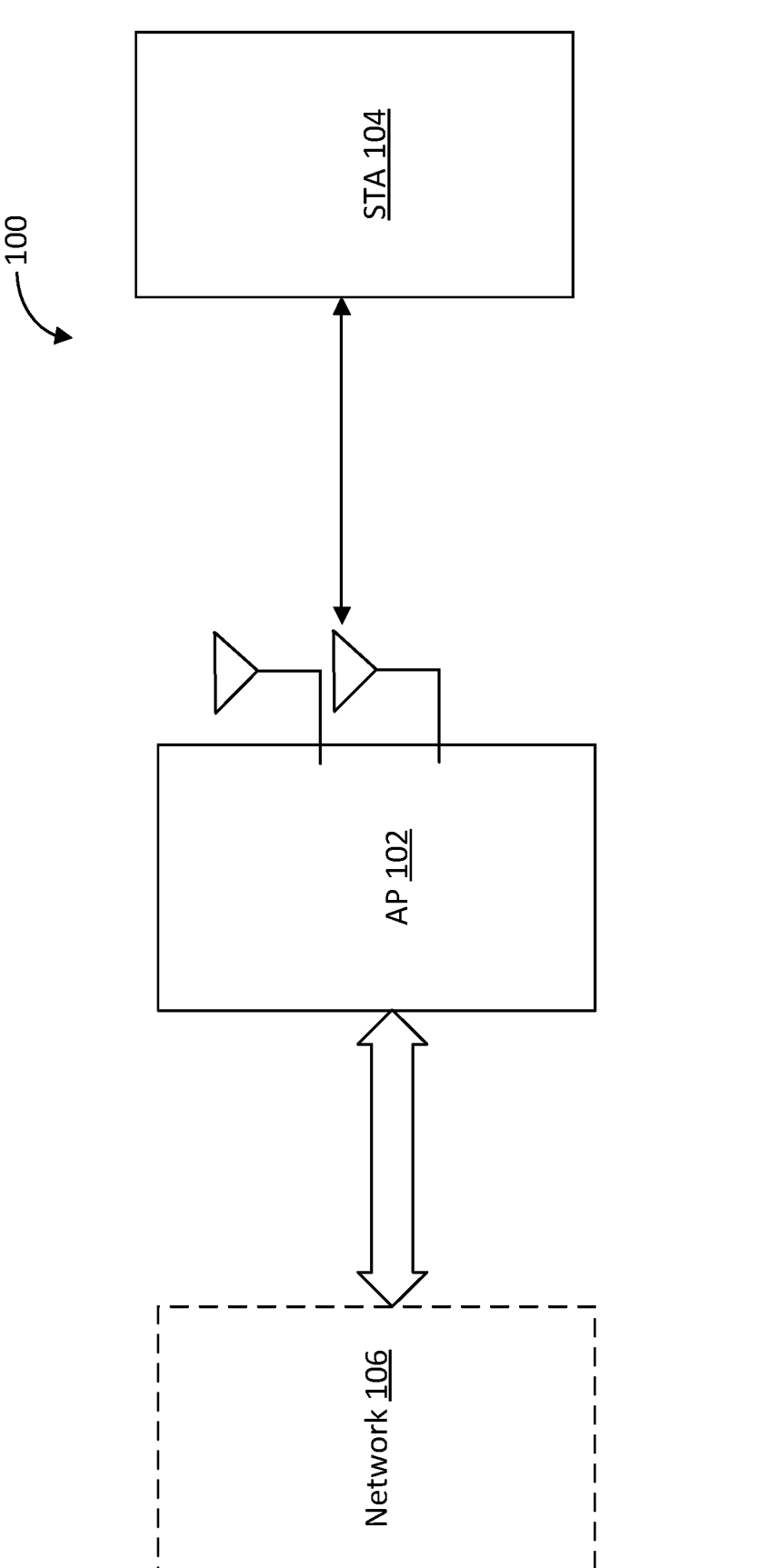
FIG. 1 illustrates an example of a wireless network that includes a plurality of wireless communication apparatuses configured to transmit and receive wireless signals.

FIG. 1 shows a wireless network 100 that includes a plurality of wireless communication devices configured to transmit and receive wireless signals according to example embodiments. The wireless network 100 may be a Wireless Local Area Network (WLAN), although embodiments are not limited as such.

The wireless communication devices include an access point station (AP) 102 and one or more non-access point stations (STAs) 104. In some embodiments, AP 102 and STA 104 may be configured to transmit and receive signals within wireless network 100 in accordance with specific communication standards and/or protocols, such as any of the Institute of Electrical and Electronics Engineers (IEEE) 802.11™ standards including, IEEE 802.11n™, IEEE 802.11ac™, IEEE 802.11ax™ and/or proposed specifications for WLANs such as IEEE 802.11be™. Communication within wireless network 100 may also be suitable to transmit and/or receive communications in accordance with other techniques and standards, including Long-Term Evolution (LTE) standard as promulgated by the Third Generation Partnership Project (3GPP). In further examples, a wireless standard can include a Fifth Generation (5G) wireless standard.

In some examples, the wireless network 100 may be configured for Very High Throughput (VHT) communications in accordance with one or more of the IEEE 802.11ac™ standard (referred to as the 11ac standard hereinafter), High Efficiency (HE) communications in accordance with the IEEE 802.11ax™ standard (referred to as the 11ax standard hereinafter), or Extremely High Throughput (EHT) in accordance with the proposed IEEE 802.11be™ standard (referred to as the 11be standard hereinafter), or any other suitable wireless communication standards between the AP 102 and the STA 104. The wireless network 100 may be configured to employ orthogonal frequency-division multiple access (OFDMA) techniques.

The STA 104 may be associated with the AP 102 through a registration procedure. Upon being associated, AP 102 is able to communicate with STA 104 in the wireless network 100. STA 104 may include any of the following: a desktop computer, a notebook computer, a tablet computer, a smartphone, an Internet-of-Things (IoT) device (e.g., a sensor, a camera, a thermostat, a household appliance, etc.), a wearable device (e.g., a smartwatch, smart eyeglasses, a head-mounted device, etc.), server computers, storage devices, and so forth.

In example embodiments, AP 102 is configured to function as an interface between the STA 104 and a network 106 where AP 102 may forward requests to the network 106 via a bi-directional communication link and pass responses received from network 106 onto STA 104 through a bi-directional wireless channel.

It is to be understood that although a single instance of each AP 102, STA 104, and network 106 is shown, there may be embodiments where multiple instances of each component are present within wireless network 100.

In some embodiments, the AP 102 and STA 104 may be configured to communicate over various wireless channel bandwidths, including bandwidths having center frequencies of about 2.4 GHz, 5 GHz, 6 GHz, and bandwidths of 20 MHz, 40 MHz, or 80 MHz, 80+80 MHz, 160 MHz, 160+160 MHz, 320 MHz. In some embodiments, the bandwidth of a channel less than 20 MHz may be used.

Figure 2:
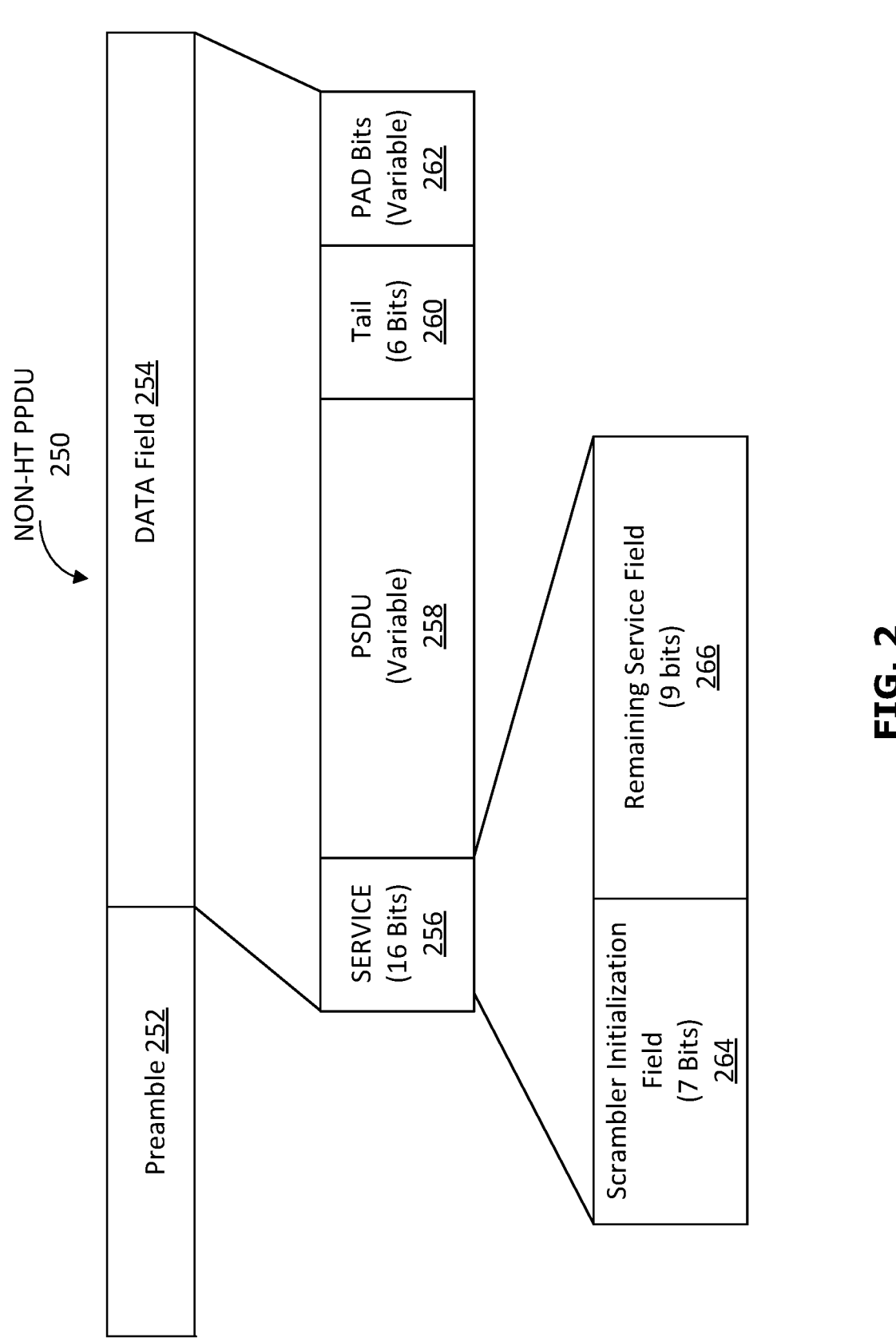
FIG. 2 illustrates an example of a data unit frame structure.

In the wireless network 100, the wireless communication devices, such as AP 102 and STA 104, communicate with one another through various well-defined packet structures. The packet structures may be generated by a processing unit of the wireless communication device. In some embodiments, a packet structure may be configurable to have the same bandwidth as a channel. Referring to FIG. 2, the packet structure may be in the form of a data unit such as a non-HT duplicate physical layer protocol data unit (PPDU) 250, including a frame preamble field 252 and a DATA field 254. The preamble field 252 contains transmission vector format information. Aspects of the transmission vector format and the PPDU structure may vary between 802.11 versions. In some embodiments, there may be different types of PPDUs that may have different fields and different PHY layers and/or different MAC layers. For example, a single user (SU) PPDU, multiple-user (MU) PPDU, long-range (LR) SU PPDU, and Trigger-Based (TB) PPDU.

The PPDU 250 is used for transmission in PHY to carry data from upper layers. The DATA field 254 in a PPDU includes a SERVICE field 256, Physical Layer Convergence Protocol (PLCP) Service Data Unit (PSDU) 258 (i.e., MAC protocol data units (MPDU)), PPDU Tail field 260 (for termination of block convolutional code (BCC) state if BCC is used) and PAD bits 262. The SERVICE field 256 includes a scrambler initialization field 264 and a remaining SERVICE field 266.

The information that is included in preamble field 252 can be modulated using one or more pre-defined coding rate and modulation schemes, such as 1/2 rate binary phase shift keying (BPSK), and can indicate a coding rate and modulation scheme for information included in the DATA field 254.

Figure 3:
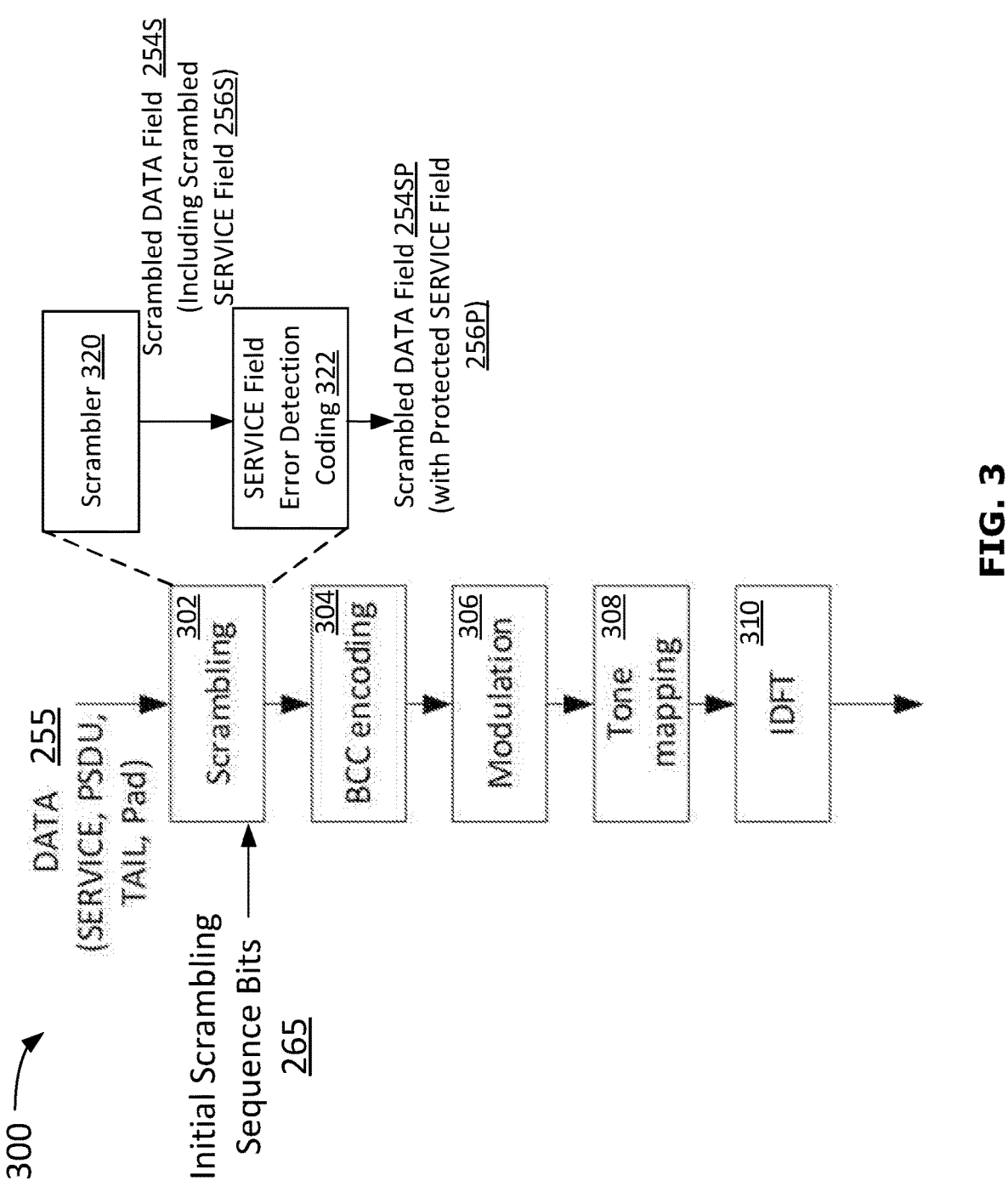
FIG. 3 is a flow diagram illustrating transmit processing of a DATA field of the data unit of FIG. 2.

FIG. 3 is flow diagram illustrating transmit processing 300 for DATA bits 255 for the DATA field 254 of the PPDU 250 of FIG. 2. For example, transmit processing 300 may be performed at a transmit (Tx) device such as an AP 102 to process a sequence of bits that will be included in the DATA field 254 of a PPDU 250 that is to be transmitted in WLAN 100 for one or more receive (Rx) devices such as STAs 104.

Transmit processing 300 can include the following processing operations: scrambling operation 302, error correction encoding operation 304, modulation operation 306, tone mapping operation 308 and IDFT operation 310. The scrambling operation 302 is a focus of the present disclosure. According to examples of the present disclosure, scrambling operation 302 includes both a scrambling function 320 and a SERVICE field error detection coding function 322. As described in greater detail below, the scrambling function 320 receives as input a sequence of DATA bits 255 for DATA field 254 and outputs a corresponding sequence of scrambled DATA bits corresponding to a scrambled DATA field 254S (including a scrambled SERVICE Field 256S). SERVICE field error detection coding function 322 is configured to determine one or more error detection bits 272 based for protecting a designated group of bits in the scrambled SERVICE Field 256S, resulting in a scrambled DATA field 254SP that includes a protected SERVICE Field 256P The remaining processing operations of transmit process 300, for example, error correction encoding operation 304 (e.g., Block Convolutional Code (BCC) or Low density parity check (LDPC) encoding), modulation operation 306, tone mapping operation 308 and IDFT operation 310. Operations 304, 306, 308 and 310 can process the scrambled, SERVICE field protected, DATA field 254SP using techniques known in the art, to generate corresponding OFDM symbols that are then modulated onto an RF carrier signal within the unlicensed spectrum and transmitted in WLAN 100.

Figure 4A:
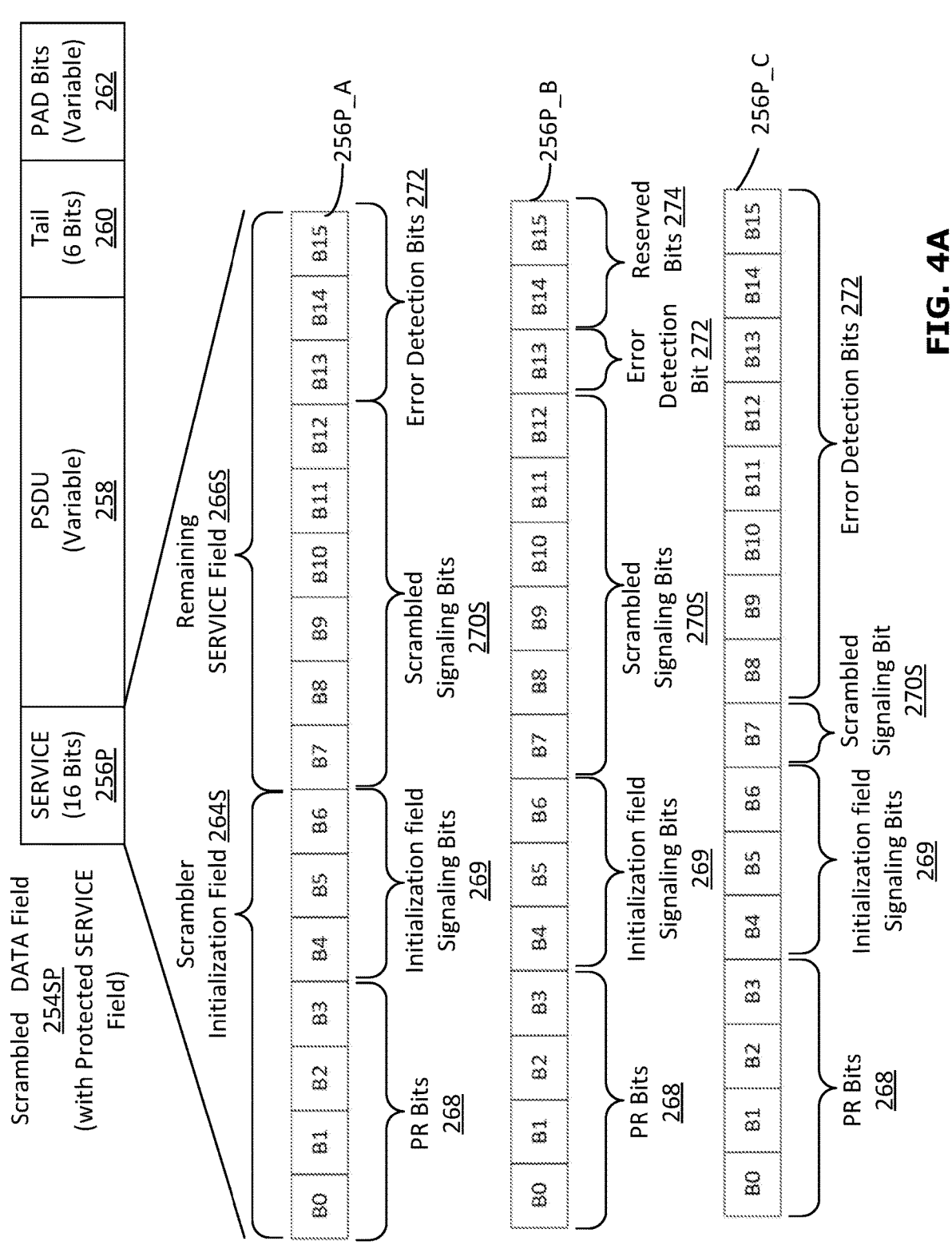
FIG. 4A illustrates example formats of a SERVICE field of the DATA field of the data unit frame structure of FIG. 2.
Figure 4B:
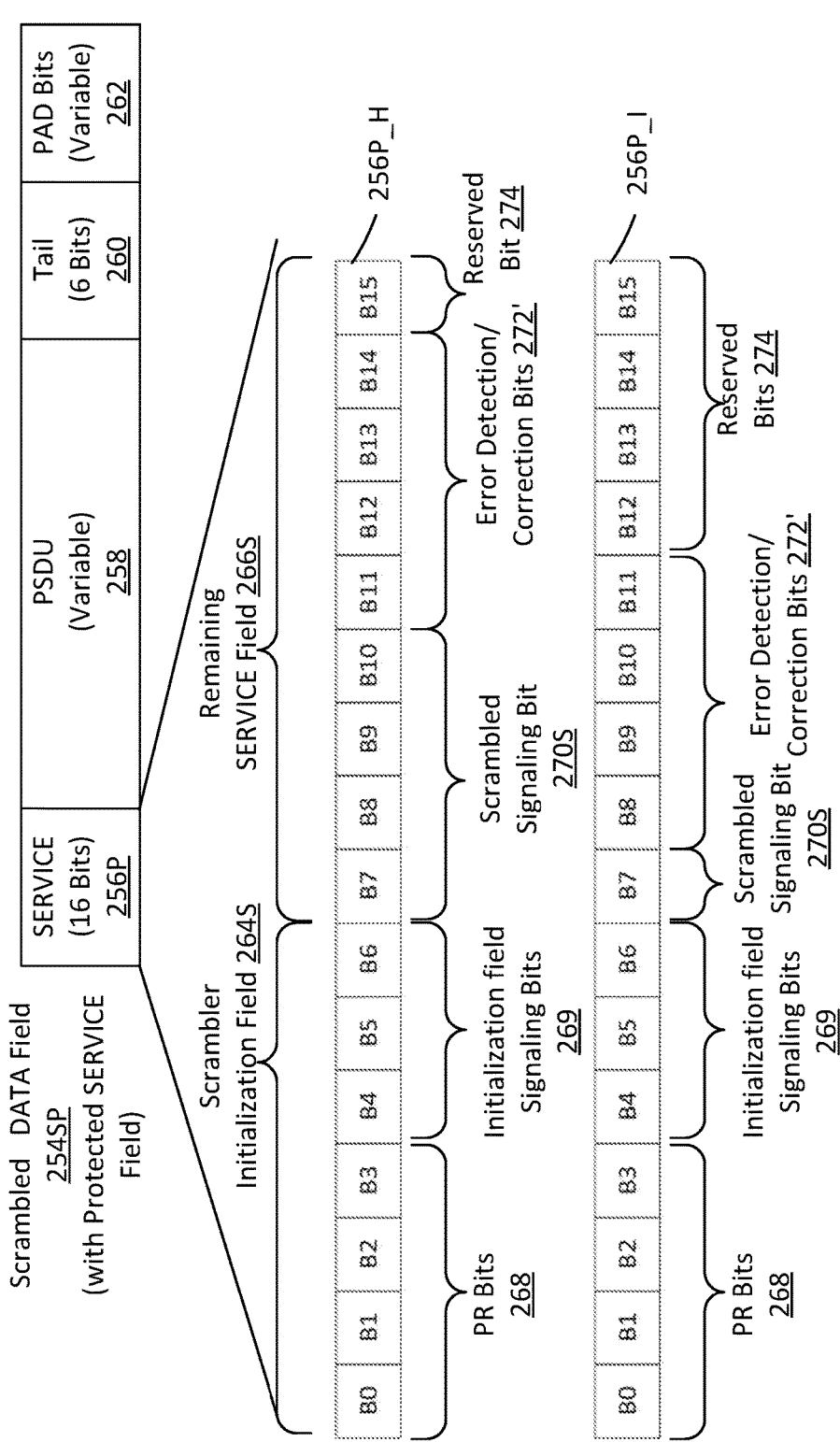
FIG. 4B illustrates further example formats of a SERVICE field of the DATA field of the data unit frame structure of FIG. 2.

The format of a protected SERVICE field 256P that is included in the scrambled, SERVICE field protected, DATA field 254SP generated by scrambling operation 302 after processing by scrambler function 320 and SERVICE field error detection coding function 322 will now be described according to examples of the disclosed embodiments. FIGS. 4A and 4B shows a plurality of different alternative configurations for a protected SERVICE field 256P, denoted respectively as protected SERVICE field formats 256P_A, 256P_B, 256P_C, 256P_H and 256P_I. All of the protected SERVICE formats 256P_A, 256P_B, 256P_C, 256P_H and 256P_I of PPDU 250 include scrambler initialization field 264S followed by scrambled remaining SERVICE field 266S. In a first example embodiment, that can correspond to a non-HT duplicate format PPDU, the protected SERVICE field 256P includes 16 bits, consisting of a seven (7) bit scrambler initialization field 264S followed by a nine (9) bit scrambled remaining SERVICE field 266S. The scrambler initialization field 264S can include a set (for example bits B0 to B3) of pseudorandom (PR) bits 268 and a set of initialization field signaling bits 269. The PR bits 268 and initialization field signaling bits 269 specify a scrambler state that is applied to the rest of the bits included in the DATA field 254 (i.e., the scrambling used for bits included in the remaining SERVICE field 266, as well as bits included in the PSDU 258, the Tail field 260 and the PAD bits 262). As known in the art, the bits included in the scrambler initialization field 264S allow a descrambling operation at a Rx device to synchronize the Rx scrambler state with the scrambler state used at the Tx device, enabling the Rx device to recover the remainder of the DATA field 254 through descrambling.

The initialization field signaling bits 269 that are included in the scrambler initialization fields 264S of each of the scrambled SERVICE field configurations 256P_A, 256P_B, 256P_C, 256P_H and 256P_I can also serve a further signaling purpose. For example, bits B5 and B6 of the scrambler initialization field 264S can be used for indicating a channel bandwidth parameter, for example a 2-bit CH_BANDWIDTH_IN_NON_HT parameter that indicates one of a 20 MHz (CBW20), 40 Mhz (CBW40), 80 MHz (CBW80) or 160 MHz (CBW160) bandwidth for a non-HT duplicate PPDU. In some examples, bit B4 of the scrambler initialization field 264S can be used for a DYN_BANDWIDTH_IN_NON_HT parameter that indicates the presence or absence of dynamic bandwidth scheduling.

In the case of protected SERVICE field format 256P_A, the remaining SERVICE field 266 that includes a six (6) bit field (e.g., field B7 to B12) can be used for scrambled signaling bits 270S by scrambling the remaining SERVICE field 266. For example, bit B7 of the remaining SERVICE field 266 may be used to provide an extra bit for the CH_BANDWIDTH_IN_NON_HT parameter to signal a channel bandwidth of 320 MHz (CW320) for a non-HT duplicate PPDU. Bits B8 to B12 of the remaining SERVICE field 266 can be used for signaling a puncturing pattern index that can for example, indicate a preamble puncturing configuration. An example of puncturing pattern index signaling is set out for example in the document: Brian Hart, Pooya Monajemi; Protecting CH_BANDWIDTH_IN_NOT_HT (etc) in Service field; Date: 2021 Jun. 20; IEEE 802.11-21/0247r4, incorporated herein by reference.

In the case of protected SERVICE field format 256P_A, the remaining SERVICE field 266S includes a 3-bit field B13 to B15 for a group of error detection bits 272 that are used to protect the SERVICE field 256P after scrambling. The calculation and insertion of error detection bits 272, which may for example be a 3-bit cyclic redundancy check (CRC) value that is based on the scrambled values included in bits B0 to B12, will be described in greater detail below.

Protected SERVICE field format 256P_B is identical to that of protected SERVICE field format 256P_A, with the exception that only a single-bit field B13 is provided for a single error detection bit 272 that is used to protect the SERVICE field 256P after scrambling. Error detection bit 272 may for example be a parity bit that is determined based on the scrambled values included in bits B0 to B12. In the case of protected SERVICE field format 256P_B, the remaining SERVICE field 266S can include a scrambled reserved bit field (e.g., bits B14, B15) for scrambled reserved bits 274 that can be assigned pre-defined meanings as required. In some examples, scrambled reserved bits 274 may be omitted from consideration when error detection bit 272 is computed, and thus are unprotected by error detection bit 272.

In the case of protected SERVICE field format 256P_C, the remaining SERVICE field 266 in SERVICE field 256 includes only a single signaling bit field (e.g., field B7) that can be used for a scrambled signaling bit 270S. For example, bit B7 the remaining SERVICE field 266 may be used to provide an extra bit for the CH_BANDWIDTH_IN_NON_HT parameter to signal a channel bandwidth of 320 MHz (CW320) for a non-HT duplicate PPDU. The remaining SERVICE field 266S provide an 8-bit field B8 to B15 for a group of error detection (or correction) bits 272 that are used to protect the preceding bits of the SERVICE field 256P after scrambling. For example error detection bits 272 can be an 8-bit cyclic redundancy check (CRC) value that is based on the scrambled values included in bits B0 to B7. In some examples of SERVICE field format 256P_C, the number of error detection bits 272 can be reduced to increase the number of scrambled signaling bits 270S and/or to permit one or more scrambled reserved bits 274 to be included.

In some examples error correction bits can be combined with error detection bits 272 to provide a set of error detection/correction bits 272' that can enable error correction as well as error detection in respect of the SERVICE field 256. By way of example, Service Error Detection coding function 322 can be configured to calculate a set of bits (error detection/correction bits 272') that enable both error detection and error correction of preceding bits in the SERVICE field 256. By way of example, a BCH (Bose, Chaudhuri, and Hocquenghem) code can be used as the error detection/correction bits 272'. Service Error Detection coding function 322 can, for example, be configured to apply a BCH (n=15,k=11) code (where n is the codeword length and k is the number of source data bits, and n−k=4 is the number of parity bits used to provide error detection and correction for the k source data bits), or a shortened BCH (n,k) code.

In this regard, in protected SERVICE field format 256P_H shown in FIG. 4B, the remaining SERVICE field 266S includes signaling bits B7 to B10 followed by a 4-bit field B11 to B14 for a group of BCH (15,11) error detection/correction bits 272' that are used to protect the preceding 11 bits B0 to B10 of SERVICE field 256P after scrambling. A reserved bit 274 is provided in bit location B15.

Protected SERVICE field format 256P_I shown in FIG. 4B is similar to that of protected SERVICE field format 256P_H, except that Protected SERVICE field format 256P_I includes only a single signaling bit location B7, followed by 4-bit field B8 to B11, corresponding to a shortened BCH code (n=12,k=8). Four error detection/correction bits 272' are used to protect the preceding 8 bits B0 to B7 of SERVICE field 256P Reserved bits 274 are provided in bit location B12 to B15.

The above examples are non-exhaustive examples of the signaling information that can be included in the scrambler initialization field 264S and remaining SERVICE field 266S. Further, in alternative examples, more or fewer bits and sub-fields may be included in the protected SERVICE field 256P. Accordingly, in the illustrated examples, the protected SERVICE field 256P includes scrambler initialization field 264S followed by a remaining SERVICE field 266S. In examples, the scrambler initialization field 264S includes PR Bits 268 as well as signaling bits (e.g., initialization field signaling bits 269) that indicate a scrambler state and the remaining SERVICE field 266 can include one or more further signaling bits that are scrambled to generate scrambled signaling bit(s) 270S in scrambled remaining SERVICE field 266S. The remaining SERVICE field 266S also includes one or more error detection bits 272 that indicate an error detection value that is calculated in respect of a group of the bits included in the scrambler initialization field 264S and, in some cases, a one or more scrambled bits (e.g., scrambled signaling bits 270S) included in the remaining SERVICE field 266S after scrambling has occurred. In some examples, the remaining SERVICE field 266S can also include scrambled reserved bits 274 in addition to 264S scrambled signaling bits 270S and the error detection bit(s) 272. The number of bits that are allocated for each of the above purposes can be different than shown in the illustrated protected SERVICE field formats 256P_A, 256P_B, and 256P_C.

An example of a methods performed by scrambler function 320 and SERVICE error detection coding function 322 to generate scrambled DATA Field 254SP with a protected SERVICE field 256P will now be described with reference to FIGS. 5, 6 and 7 in the context of protected SERVICE field formats 256P_A, 256P_B, 256P_C, 256_H and 256_I.

Figure 5:
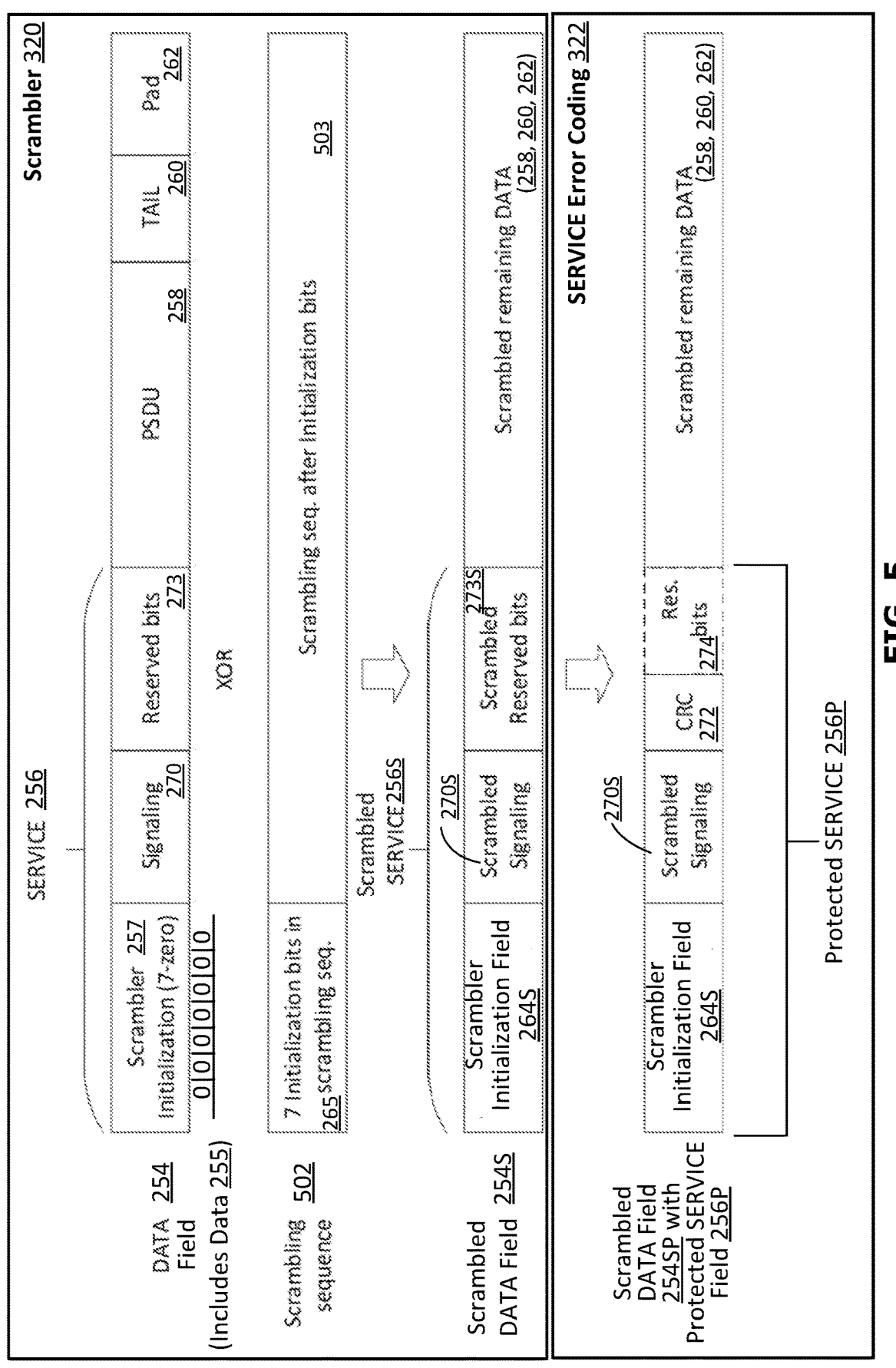
FIG. 5 is a block diagram representation of a scrambling operation used for transmit processing of the DATA field.
Figures 6, 7:
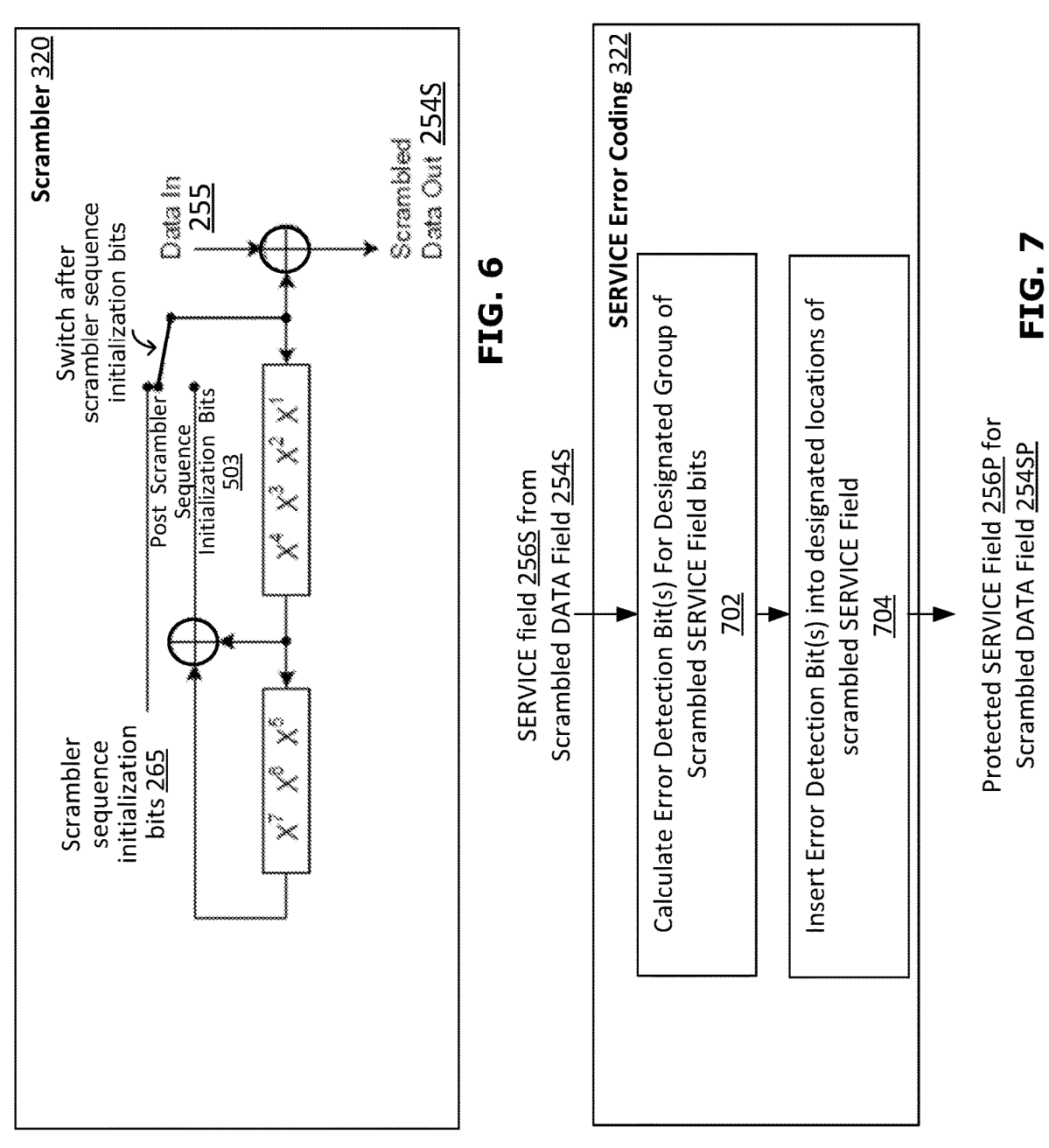
FIG. 6 is a representation of a scrambler function used for a scrambling operation, according to a first example.
FIG. 7 is a representation of a SERVICE error coding function used for the scrambling operation.

As indicated in FIGS. 3, 5 and 6, scrambler function 320 receives as inputs: (1) a sequence of DATA bits 255 corresponding to an input DATA field 254 for PPDU 250, including bits corresponding to an unscrambled SERVICE field 256, as well as unscrambled bits for the PSDU 258, Tail field 260 and PAD bits 262; and (2) scrambler sequence initialization bits 265. In the illustrated example, the scrambler sequence initialization bits 265 consists of seven (7) bits that are used to populate the scrambler initialization field 264S, including four (4) PR bits 268, followed by three (3) initialization field signaling bits 269. The first seven (7) bits 257 of the sequence of input DATA bits 255 that correspond to the scrambler initialization field 264S are set to zero so that they will not affect the scrambler sequence initialization bits 265 during scrambling.

As illustrated in FIGS. 5 and 6, the scrambler function 320 is configured to apply an Exclusive OR (XOR) operation to combine the DATA bits 255 with the bits of a scrambling sequence 502 to output sequence of scrambled bits for a scrambled DATA field 254S that includes scrambled SERVICE field 256S. The scrambling sequence 502 includes scrambler sequence initialization bits 265 as its first seven (7) bits, followed by a post-initialization bits scrambling sequence 503 that is generated by applying a scrambler polynomial (e.g., $S(X)=X^7+X^4+1$) to bits in the scrambling sequence 502 following the scrambler sequence initialization bits 265. The resulting XOR output scrambled DATA field 254S will include: the seven (7) scrambler sequence initialization bits 265 (for sequence initialization field 264S) (e.g., PR bits 268 and initialization field signaling bits 269) which will be unchanged from their original values, followed by a sequence of scrambled bits that will include: scrambled signaling bits 270S, scrambled reserved bits 273S, and scrambled remaining data (e.g., data bits for PSDU 258, TAIL field 260 and PAD bits 262). In the illustrated example, the scrambled reserved bits 273S includes bits locations that are pre-assigned for error detection bit(s) 272 and any scrambled reserved bits 274 that are ultimately included in the protected SERVICE field 256P. By way of illustrative example, in the case of protected SERVICE field formats 256P_A and 256P_B, scrambled signaling bits 270S will correspond to bits B7 to B12 of the SERVICE field 256, and scrambled reserved bits 273S will correspond to bits B13 to B15 of the SERVICE field 256. In the case of protected SERVICE field format 256P_C, scrambled signaling bit 270 will correspond to bit B7 of the SERVICE field 256, and scrambled reserved bits 273S will correspond to bits B8 to B15 of the SERVICE field 256.

With reference to FIGS. 5 and 7, according to a novel and advantageous aspect of the present disclosure, SERVICE error detection coding function 322 is configured to process a group of SERVICE bits included in the scrambled SERVICE field 256S of scrambled DATA field 254S to output an error-protected sequence of scrambled SERVICE bits, resulting in scrambled DATA field 254SP with protected SERVICE Field 256P.

In this regard, in the case of protected SERVICE field formats 256P_A, 256P_B, and 256P_C, SERVICE field error detection coding function 322 is configured to calculate one or more error detection bits 272 for a designated group of bits included in the scrambled SERVICE field 256S (Block 702). In the illustrated example, the designated group of bits consists of the seven (7) scrambler initialization bits 265 (which as noted above are unscrambled) that are include in the scrambler initialization field 264S and any scrambled signaling bits 270S included in the scrambled SERVICE field 256S. SERVICE field error detection coding function 322 then inserts the calculated error detection bit(s) 272 into designated error detection bit locations of the scrambled SERVICE field 256 (Block 704). In the illustrated example, the designated error detection bit locations correspond to one or more locations of the scrambled reserved bits 273.

As noted above, in some examples the error detection bits 272 are CRC bits. For example, Block 702 of SERVICE error detection coding function 322 can be configured to apply N-bit CRC (e.g., CRC-N), where N corresponds to the number of error detection bits 272. By way of illustration, in the case of protected SERVICE field format 256P_A, a CRC-3 value is computed based on the values of bits B0 to B12, which includes the seven (7) scrambler sequence initialization bits 265 from the scrambler initialization field 264S (including PR bits 268 and initialization field signaling bits 269) and the scrambled signaling bits 270S. At Block 704, the three (3) bit CRC value is then inserted as error detection bits 272 into the locations of bits B13 to B15, overwriting the scrambled reserved bits 273S previously at those bit locations.

In the case of protected SERVICE field format 256P_C, a CRC-8 value is computed based on the values of bits B0 to B7, which includes the seven (7) scrambler sequence initialization bits 265 (including PR bits 268 and initialization field signaling bits 269) and the scrambled signaling bit 270. At Block 702, SERVICE field error detection coding function 322 could for example apply a CRC-8-CCITT compliant coder that applies a generator polynomial $G(X)=X^8+X^2+X+1$. At Block 704, the eight (8) bit CRC value is then inserted as error detection bits 272 into locations of bits B8 to B15.

In the case of protected SERVICE field format 256P_B, at Block 702 a parity check value can be computed based on the values of bits B0 to B12, which includes the seven (7) scrambler sequence initialization bits 265 (including PR bits 268 and initialization field signaling bits 269) and the scrambled signaling bits 270S. At Block 704, the one (1) bit parity check value is then inserted as error detection bit 272 into bits location B13. In such example, bit locations B14 and B15 are not affected by the SERVICE Error detection coding function 322 and correspond to reserved bits 274.

In the case of protected SERVICE field formats 256P_H, and 256P_I, SERVICE field error detection coding function 322 is configured to calculate error detection/correction bits 272' for a designated group of bits included in the scrambled SERVICE field 256S (Block 702), using a BCH code for example. Accordingly, in the case of each of the SERVICE field formats, the scrambled DATA field 254SP with protected SERVICE field 256P is identical to the scrambled DATA field 254S with the exception that one or more of the scrambled reserved bits 273 of the scrambled DATA field 254S is replaced with respective error detection bits 272 that are configured to protect a designated group of bits of the SERVICE field 256P. The resulting DATA field 254SP with protected SERVICE field 256P is passed onto the error correction encoding operation 304 (e.g., BCC encoding) of the transmit process 300.

Figure 8:
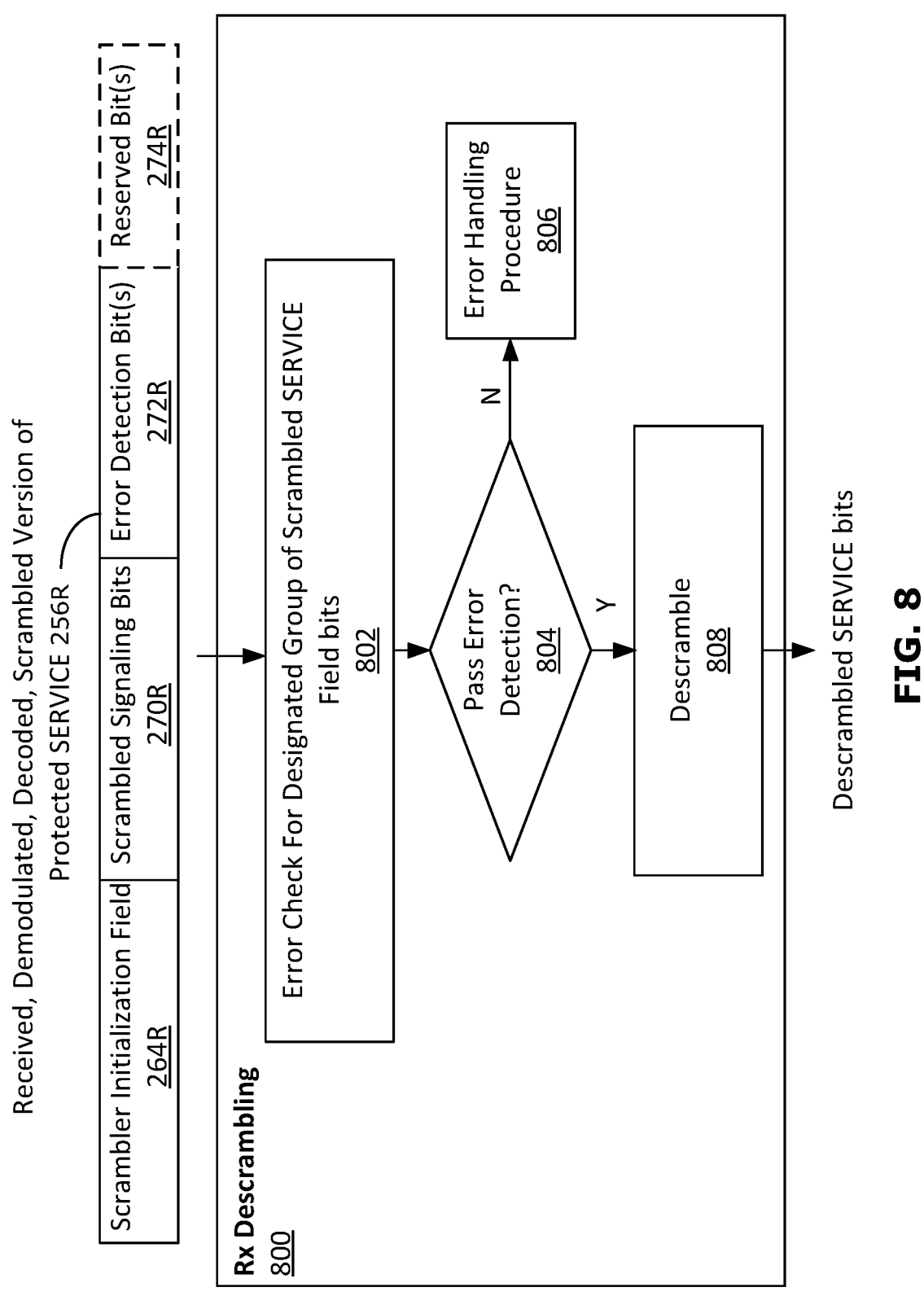
FIG. 8 is a flow diagram of a receive device descrambling operation.

In example embodiments, at an Rx device (e.g., STA 104) a received PPDU 250 is processed to recover a received version of the DATA bits 255. In particular, the received signal is down converted, demodulated and then decoded (e.g., using BCC or LDPC decoding as applicable) to recover a demodulated and decoded version of the bits included in the SERVICE field 256. FIG. 8 illustrates a descrambling operation 800 that is performed by an Rx device on a recovered, scrambled version of protected SERVICE field 256R, which as illustrated includes: recovered scrambler sequence initialization bits 264SR (which can include recovered versions of PR bits 268 and initialization field signaling bits 269); recovered scrambled signaling bits 270R; recovered error detection bits 272R; and recovered reserved bits 274R (if applicable). The recovered error detection bits 272R are extracted and used to error check a designated group of the other bits included in scrambled version of protected SERVICE field 256R, namely recovered scrambler initialization bits 264SR and recovered scrambled signaling bits 270R (Block 802). The error check procedure will correspond to the type of error protection/correction applied at the TX device (e.g., CRC-N or parity or BCH). A determination is made if the designated group passes error detection or not (Block 804). If not, the Rx descrambling process can be idled and a suitable error handling process 806 performed (alternatively, in the case where a BCH error detection and correction code has been used, then the error can be corrected and the process can continue). If the designated group of SERVICE bits pass error detection (or can be corrected, as in the case where a BCH code is used), then the descrambling state that is specified in the recovered scrambler initialization bits 264SR is confirmed as valid and can be used to descramble (Block 808) the scrambled remaining SERVICE bits, including recovered scrambled signaling bits 270R and, if applicable, reserved bits 274R. The same scrambler configuration (e.g., scrambler 320) that is used for the transmit process 300 can be applied at the receive device to perform descrambling. The recovered Scrambler Initialization bits 264SR can also be used to descramble the rest of the scrambled DATA bits, and the descrambled versions of scrambled signaling bits 270R can be used as required by the receiving device.

In at least some applications, the calculation of error detection bits 272 for the SERVICE field 256 to enable post-scrambling protection of the SERVICE field 256 prior to error correction encoding operation 304 can enable errors to be detected in the initial scrambling sequence and signaling bits that might otherwise go undetected. For example, in the absence of post-scrambling, pre-error encoding protection, undetected errors in the SERVICE field can result in error propagation through the descrambling process at the receiver due to an error in setting an initial descrambler state. In particular, the scrambler initialization bits 265 from field 264S at the Tx device are used by the Rx device to initialize the state of the descrambler. At an Rx device, the presence of a single residue error within the decoded initialization bits in the scrambling sequence can cause the initial state of the descrambler to be in error, resulting in an incorrect descrambling sequence that will result in an invalid descrambling of the entire DATA field. The SERVICE field protection methods disclosed herein mitigate against undetected errors in the scrambler initialization bits.

Figure 9:
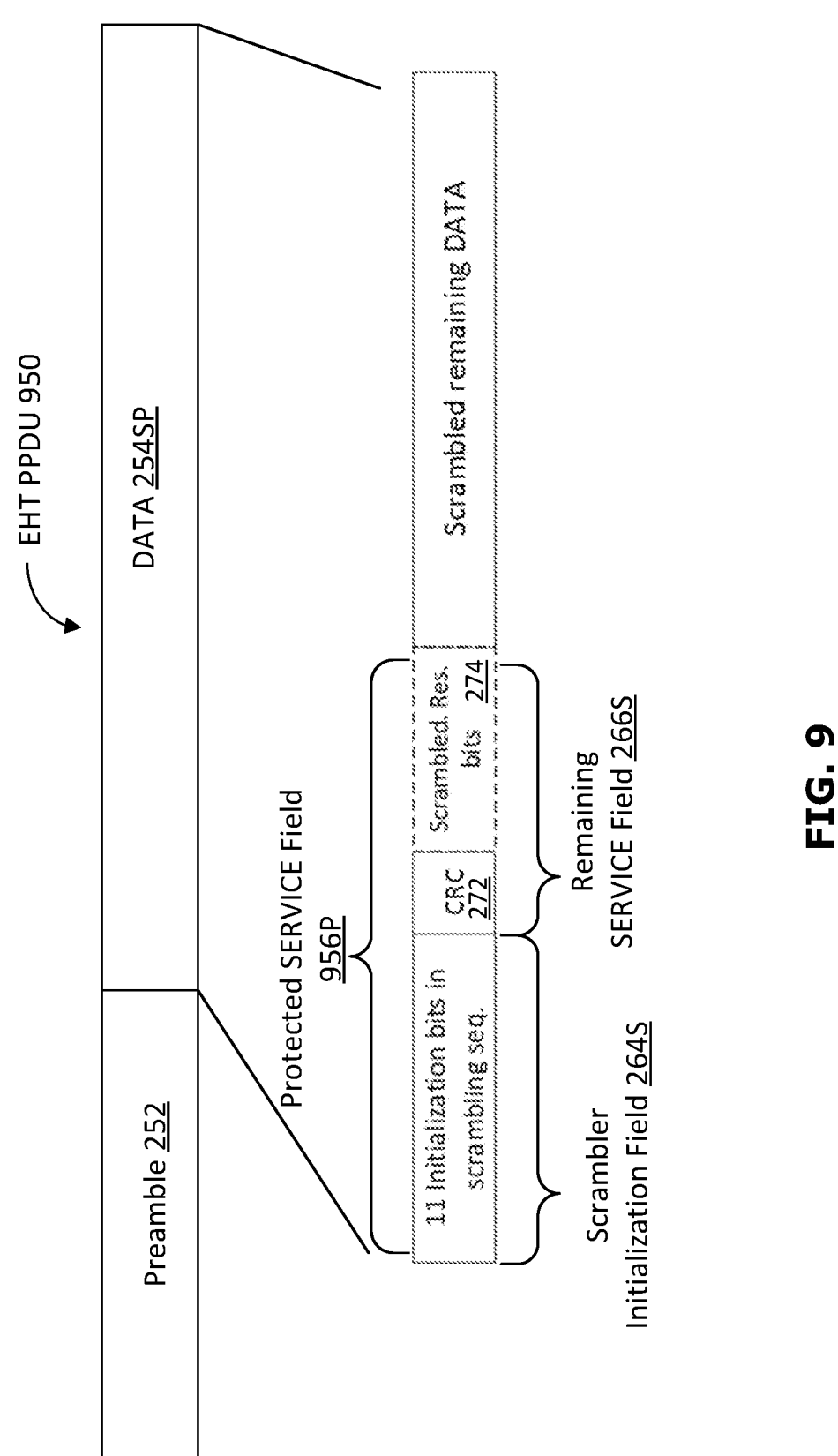
FIG. 9 illustrates an example of a further data unit frame structure.

The examples described above have been in the context of a non-HT format PPDU 250. In alternative examples, SERVICE field error protection techniques disclosed herein can also be applied to other data unit formats, including for example an EHT PPDU format such as may be used for 802.11be compliant EHT transmissions. In this regard, FIG. 9 shows a further example of a PPDU 950, which can be an EHT PPDU format. EHT PPDU 950, which may for example be an 802.11be compliant format, also includes a preamble field 252 and a scrambled DATA field 254SP with protected SERVICE field 956P. Similar to Non-HT PPDU 250, the scrambled DATA field 254SP DATA field 254 of EHT PPDU 950 includes a SERVICE field 956, PSDU 258, tail field 260 and PAD Bits 262. The protected SERVICE field 956P of EHT PPDU 950 differs from the protected SERVICE field 256P of Non-HT PPDU 250 in that: (1) protected SERVICE field 956P has eleven (11) scrambler sequence initialization bits 264S included in scrambler initialization field 264S (Field B0 to B10) compared to seven (7) bits for Non-HT protected SERVICE field 256P; and (2) protected SERVICE field 956P has a remaining SERVICE field 266S of five (5) bits 266S (Field B11 to B15) compared to nine (9) bits for Non-HT protected SERVICE field 256P. In an example embodiment, one or more of the bit locations corresponding to the remaining SERVICE field 266S are assigned for use as error detection bits 272.

Figure 10:
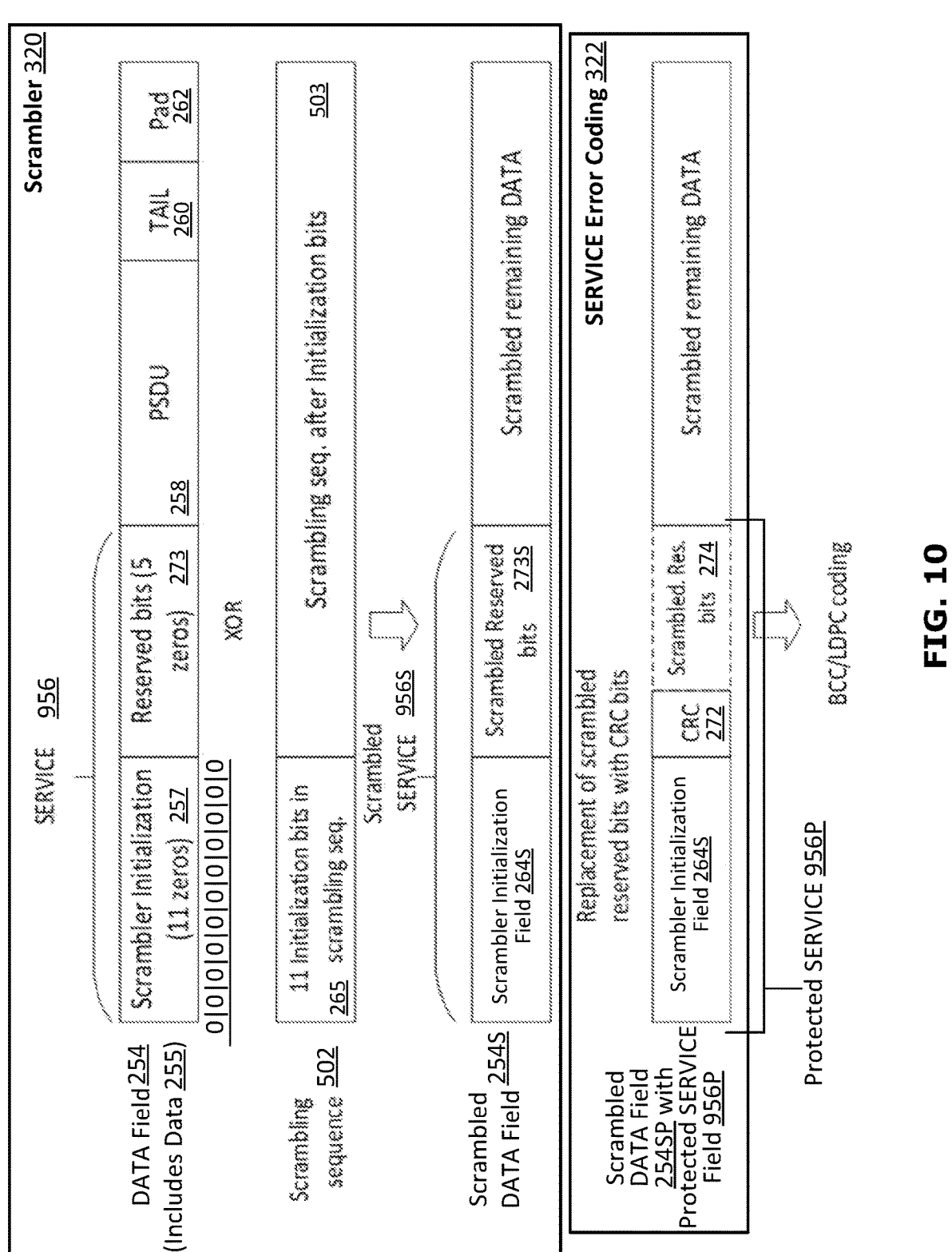
FIG. 10 is a block diagram representation of a scrambling operation used for transmit processing of the DATA field of the data unit frame structure of FIG. 9.
Figure 11:
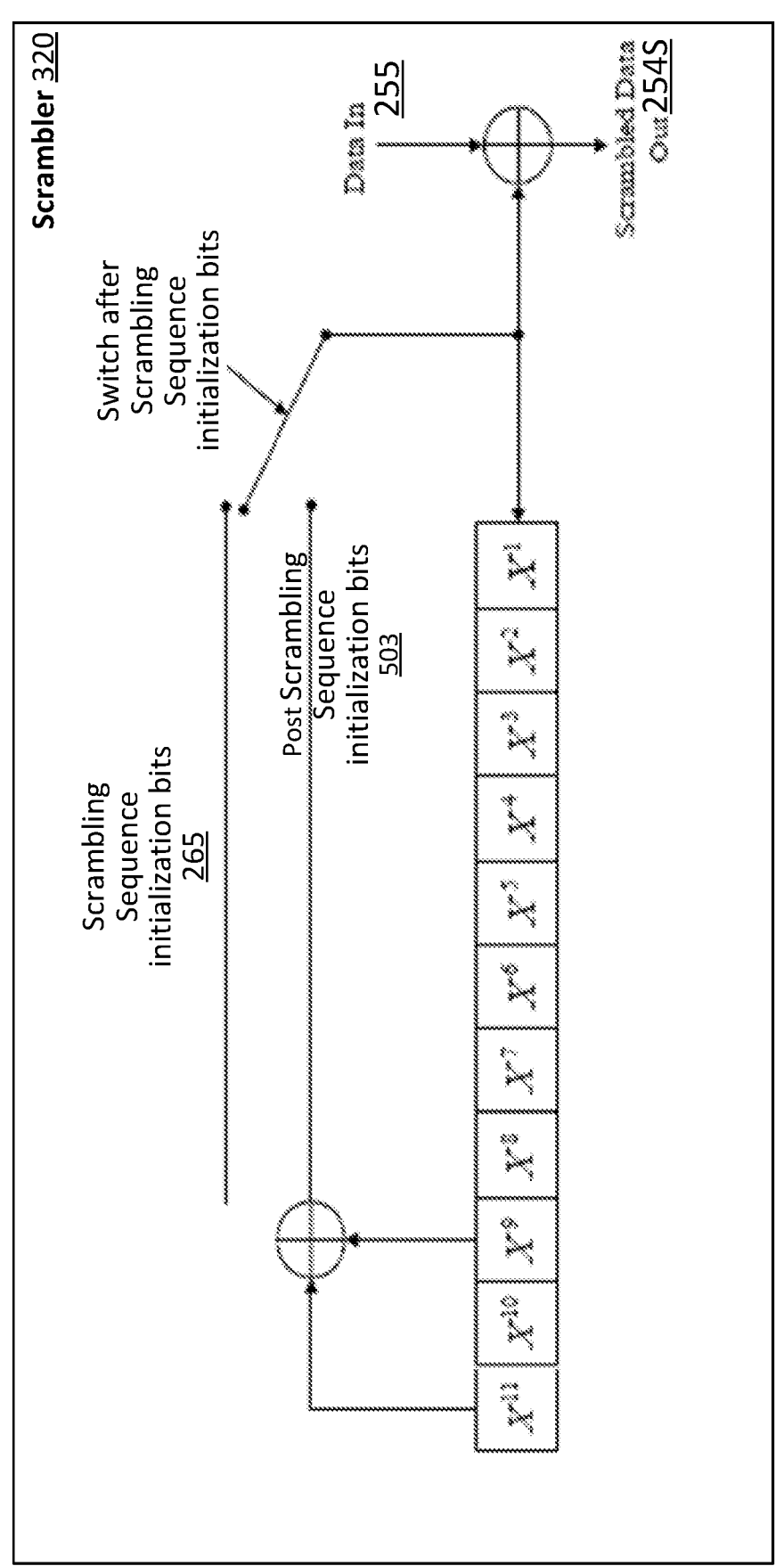
FIG. 11 is a representation of a scrambler function used for a scrambling operation in respect of the scrambling operation of FIG. 10.

FIG. 10 shows an example of scrambling operation 302 in the context of EHT PPDU 950. FIG. 11 shows a scrambler function 320 that can be used in the context of EHT PPDU 950. Similar to the case of Non-HT PPDU 250, scrambler function 320 receives as inputs: (1) a sequence of DATA bits 255 corresponding to an unscrambled DATA field 254, including data bits for the unscrambled SERVICE field 956, PSDU 258, Tail field 260 and PAD bits 262; and (2) a set of scrambler sequence initialization bits 265. In the illustrated example, the scrambler sequence initialization bits 265 consists of eleven (11) bits, which can all be PR bits 268 that indicate an initial scrambler state. In some examples, the scrambler sequence initialization bits 265 can include both PR bits 268 and one or more initial signaling bits.

In some examples, the first eleven (11) bits 257 of the sequence of DATA bits 255 that correspond to the scrambler initialization field 264S are set to zero so that they will not affect the scrambler sequence initialization bits 265 during scrambling. The next five (5) bits (e.g., B11 to B15) of the sequence of DATA bits 255, which can correspond to the remaining SERVICE field 266S, are reserved bits 274A, and can also be set to zero.

As illustrated in FIGS. 10 and 11, the scrambler function 320 is configured to apply an Exclusive OR (XOR) operation to combine the DATA bits 255 with the bits of a scrambling sequence 502 to output a sequence of scrambled DATA field 254S. The scrambling sequence 502 includes the scrambler sequence initialization bits 265 as its first eleven (11) bits, followed by a post-initialization bits scrambling sequence 503 that is generated by applying a scrambler polynomial (e.g., $S(X)=X^{11}+X^9+1$). The resulting XOR output scrambled DATA field 254S will include: the eleven (11) bit scrambler initialization field 264S that will consist of the scrambler sequence initialization bits 265 (e.g., PR bits 268) which will be unchanged from their original values, followed by a sequence of scrambled bits that will include: scrambled reserved bits 273S, and scrambled remaining data (e.g., data bits for PSDU 258, TAIL field 260 and PAD bits 262). In the illustrated example, the scrambled reserved bits 273S includes bit locations that are pre-assigned for error detection bit(s) 272 and scrambled reserved bits 274 (if present).

Service Error Detection coding function 322 is configured to calculate one or more error detection bits 272 in respect of the eleven (11) scrambler sequence initialization bits included in scrambler initialization field 264S. Service Error Detection coding function 322 then inserts the calculated error detection bit(s) 272 into designated error detection bit locations of the scrambled SERVICE field 956S. In the illustrated example, the designated error detection bit locations correspond to one or more locations of the scrambled reserved bits 273S.

In some examples, the error detection bits 272 are CRC bits and error detection coding function 322 is configured to apply N-bit CRC (e.g., CRC-N), where N is in the range of 1 to 5 and corresponds to the number of error detection bits 272. By way of illustration, in the case where all of the reserved bits 273S are to be used for CRC error detection bits, a CRC-5 value is computed based on the values of bits B0 to B10, which includes the eleven (11) bits of the scrambler initialization field 264S. The five (5) bit CRC value is then inserted as error detection bits 272 into the locations of bits B11 to B15 in the scrambled SERVICE field 956S to provide protected SERVICE field 956P. For the case of CRC-5, there will not be any scrambled reserved bits 274 included in the protected SERVICE field 956P of the SERVICE protected scrambled DATA field 254SP. In some examples, one or more of a subset of the bits included in the scrambled remaining SERVICE field 266S could be used as signaling bits and included in the designated group of bits that the error detection bits 272 protects.

Accordingly, the scrambled DATA field 254SP with protected SERVICE field 956P is identical to scrambled DATA field 254S with the exception that one or more of the scrambled reserved bits 273S of the sequence of scrambled DATA field 254S is replaced with respective error detection bits 272 that are configured to protect a designated group of bits (i.e., scrambler sequence initialization bits 265 included in scrambler initialization field 264S) of the protected SERVICE field 956P. Scrambled DATA field 254SP with protected SERVICE field 956P is passed onto the error correction encoding operation 304 (e.g., BCC encoding or LDPC encoding) of the transmit process 300.

Rx device processing of a received EHT PPDU 950 to recover scrambler initialization bits 265 is similar to that described above in respect of Non-HT PPDU 250, with the Rx descrambling operation applying CRC decoding that corresponds to the Tx CRC coding and, following a successful error check, a descrambler function that corresponds to the Tx scrambler function 320.

In the above described examples of the disclosure, the one or more error detection bits 272 are located among the scrambled bits included in the remaining SERVICE field 266S of the protected SERVICE field 956P, and are not located within the scrambler initialization field 264S. This configuration enables the one or more error detection bits 272 to be computed based on the entire content of the scrambler initialization field 264S (which can include PR bits 268 and some initialization field signaling bits 269) indicating the scrambler state. Furthermore, one or more additional scrambled signaling bits 270S that are located among the bits of the remaining SERVICE field 266S can also be included with the bits of the scrambler initialization field 264S when computing the one or more error detection bits 272. Thus, the above described examples provide a mechanism by which a designated group of bits that includes bits within both the scrambler initialization field 264S and the scrambled remaining SERVICE field 266S of the scrambled SERVICE field can be protected with the same set of one or more error detection bits 272.

Figures 12, 13:
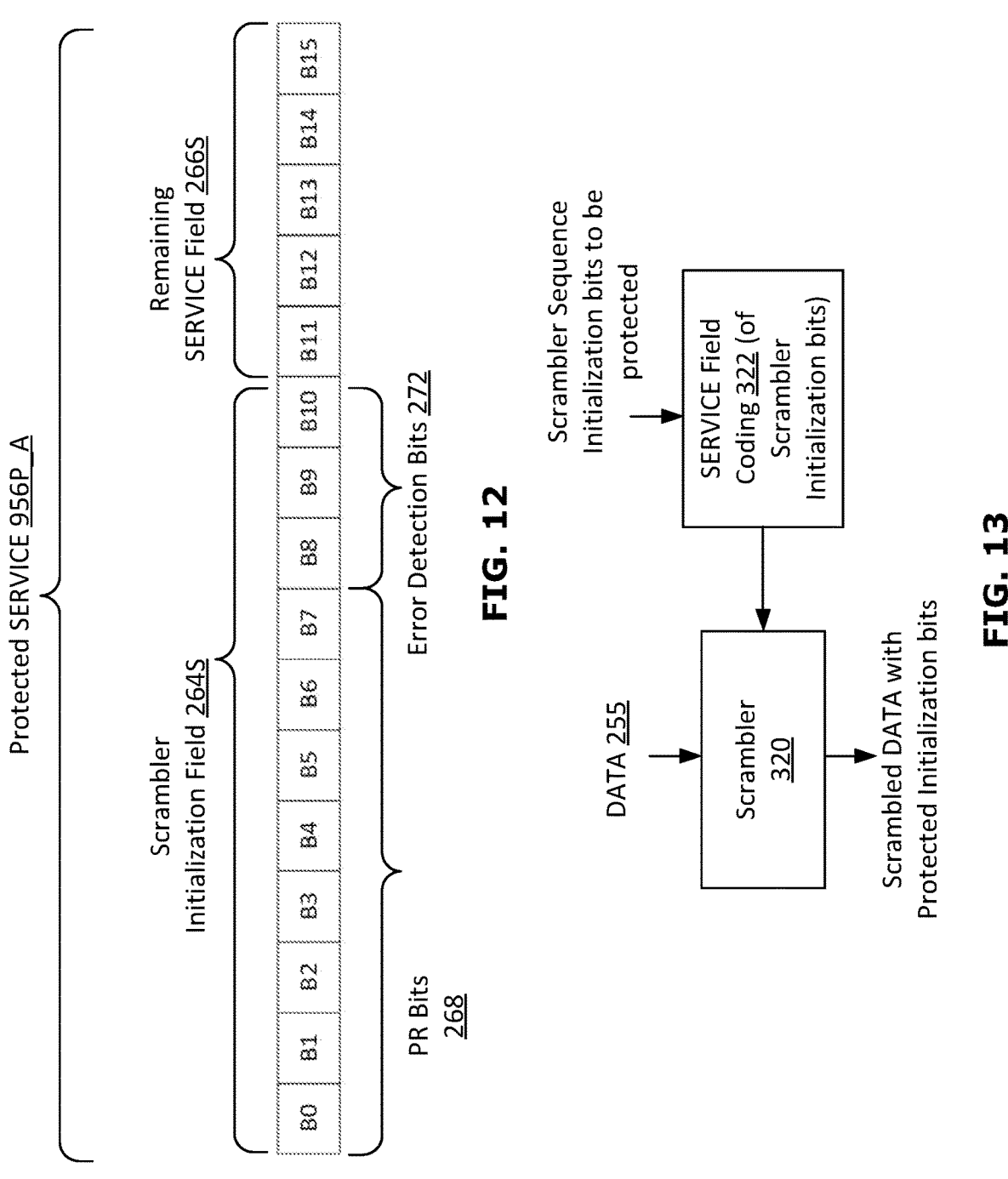
FIG. 12 illustrates a further example format of a SERVICE field of the DATA field of a data unit frame structure.
FIG. 13 is a block diagram representation of a scrambling operation used for transmit processing of a DATA field that includes the SERVICE field of FIG. 12.

In further examples of the disclosure, one or more error detection bits 272 are used only to protect bits included within the scrambler initialization field 264S, as will now be described with respect to FIGS. 12 to 14. FIG. 12 illustrates an alternative format of a protected SERVICE field 956P_A for use in an EHT PPDU 950. In the example of FIG. 12, the error detection bits 272 are included within the scrambler initialization field 264S rather than within the scrambled remaining SERVICE field 266S. The error detection bits 272 (which can include one or more error detection bits) are calculated based on the values of the bits that precede them in the scrambler initialization field 264S. For example, in the case of CRC-3, the error detection bits 272 are assigned bit locations B8 to B10 and protect the PR bits 268 included in bit locations B0 to B7 in the scrambled SERVICE field 956A.

As noted above, the scrambler sequence initialization bits 265 are not affected by scrambler function 320. Accordingly, the format of protected SERVICE field 956P_A of FIG. 12 enables error detection bits 272 to be determined 264S prior to scrambling of the sequence of DATA bits 255. At the scrambling operation 302 of the transmit process 300, SERVICE field error detection coding function 322 can be applied prior to scrambler function 320, as illustrated in the flow diagram of FIG. 13, and the error detection bits can form part of the initial scrambler initialization sequence included in the scrambler initialization field. At the RX device side, the SERVICE field can be recovered in the same manner as described above.

In the case of HT PPDU 950 format of either FIG. 9 or FIG. 12, the error correction encoding applied at error correction encoding operation 304 can be one of BCC or LDPC encoding. If BCC encoding is used, then at the Rx device error detection of decoded Initialization bits in scrambling sequence is performed after the decoding of the whole DATA field. However, if LDPC encoding is used, because LDPC encoding is a block coding, then at the Rx device, error detection of decoded Initialization bits in the scrambling sequence can be performed after Initialization bits in scrambling sequence are decoded. This can be much earlier than completion of decoding for the whole DATA field. This can yield significant benefits for Rx implementation, i.e., terminating the Rx process earlier when the initial state of descrambler is identified to be in error.

Figure 14:
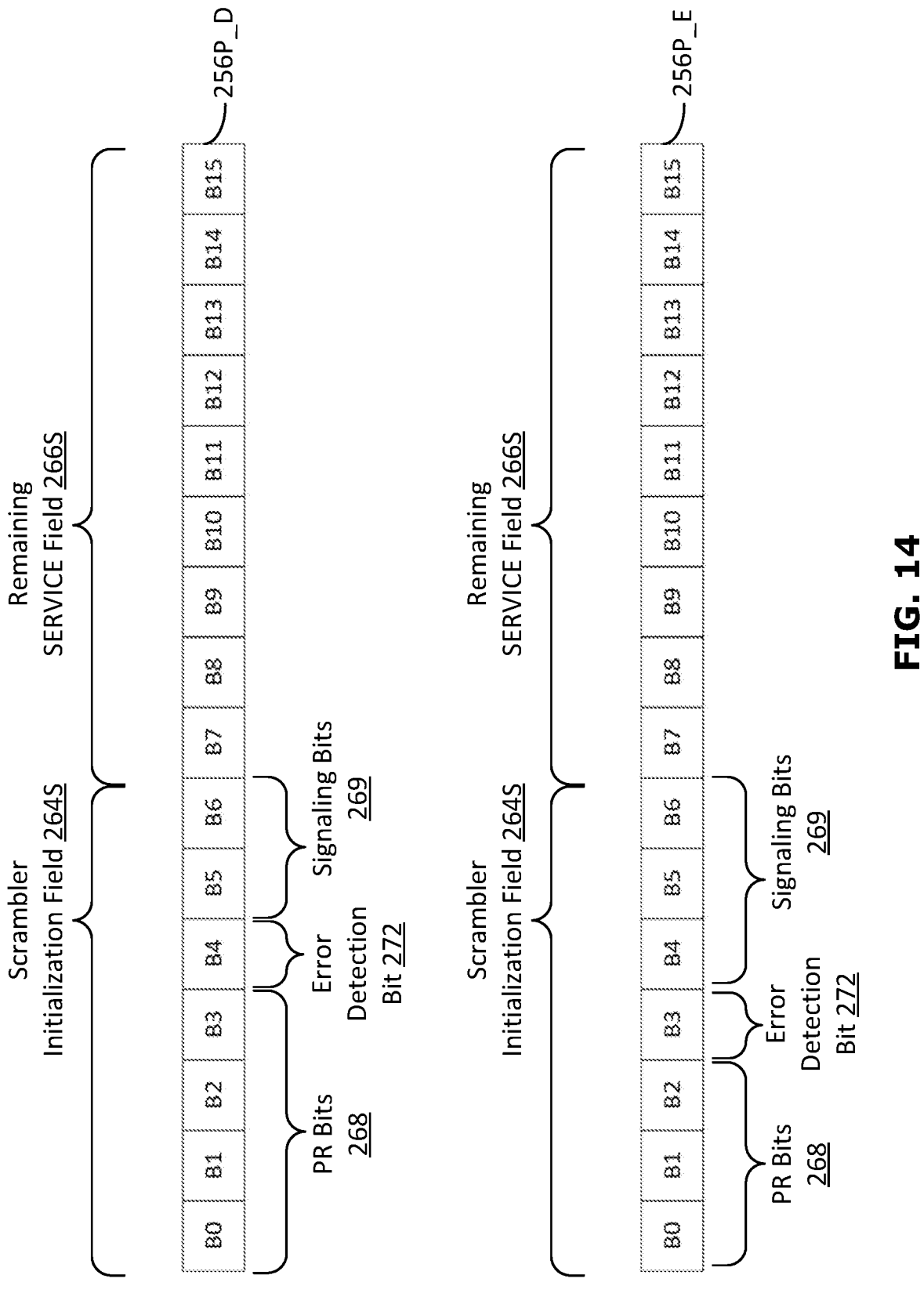
FIG. 14 illustrates further example formats of a SERVICE field of the DATA field of the data unit frame structure of FIG. 2.

FIG. 14 shows further examples of alternative formats of a protected SERVICE field 256P_D and a protected SER-VICE field 256P_E for a Non-HT PPDU 250. Similar to the protected SERVICE field 956P_A described above in respect of FIGS. 12 and 13, the protected SERVICE fields 256P_D and 256P_E also include one or more error detection bits 272 within the scrambler initialization field 264S rather than within the scrambled remaining SERVICE field 266S. In the case of protected SERVICE field 256P_D, error protection for four PR bits 268 in bit locations B0 to B3 and two Signaling bits 269 is provided by a single error detection bit 272 that is assigned bit location B4. Bit locations B5 and B7 are assigned to signaling bits 269, which can for example be CH_BANDWIDTH_IN_NON_HT bits. Error detection bit 272 is a parity check bit that is computed based on the content of PR bits 268 and Signaling bits 269. As the seven (7) scrambler initialization bits of the scrambler initialization field 264S are not scrambled by scrambler 320, SER-VICE error detection coding function 322 can be applied prior to scrambler function 320, as illustrated in the flow diagram of FIG. 13. At the RX device side, the SERVICE field can be recovered in the same manner as described above.

The format of protected SERVICE field 256P_E is similar to that of protected SERVICE field 256P_D, except that the scrambler sequence initialization bits of scrambler initialization field 264S include three PR bits 268 (i.e. at bit locations B0 to B2) together with three Signaling bits that are protected by a single error detection bit 272 that is assigned bit location B3. Bit locations B4-B6 of the scrambler initialization bit field 264S are assigned to signaling bits 269, which can for example be a DYN_BANDWIDTH_IN_NON_HT bit (bit location B4) and CH_BAND-WIDTH_IN_NON_HT bits (bit locations B5 and B6)

Figure 15:
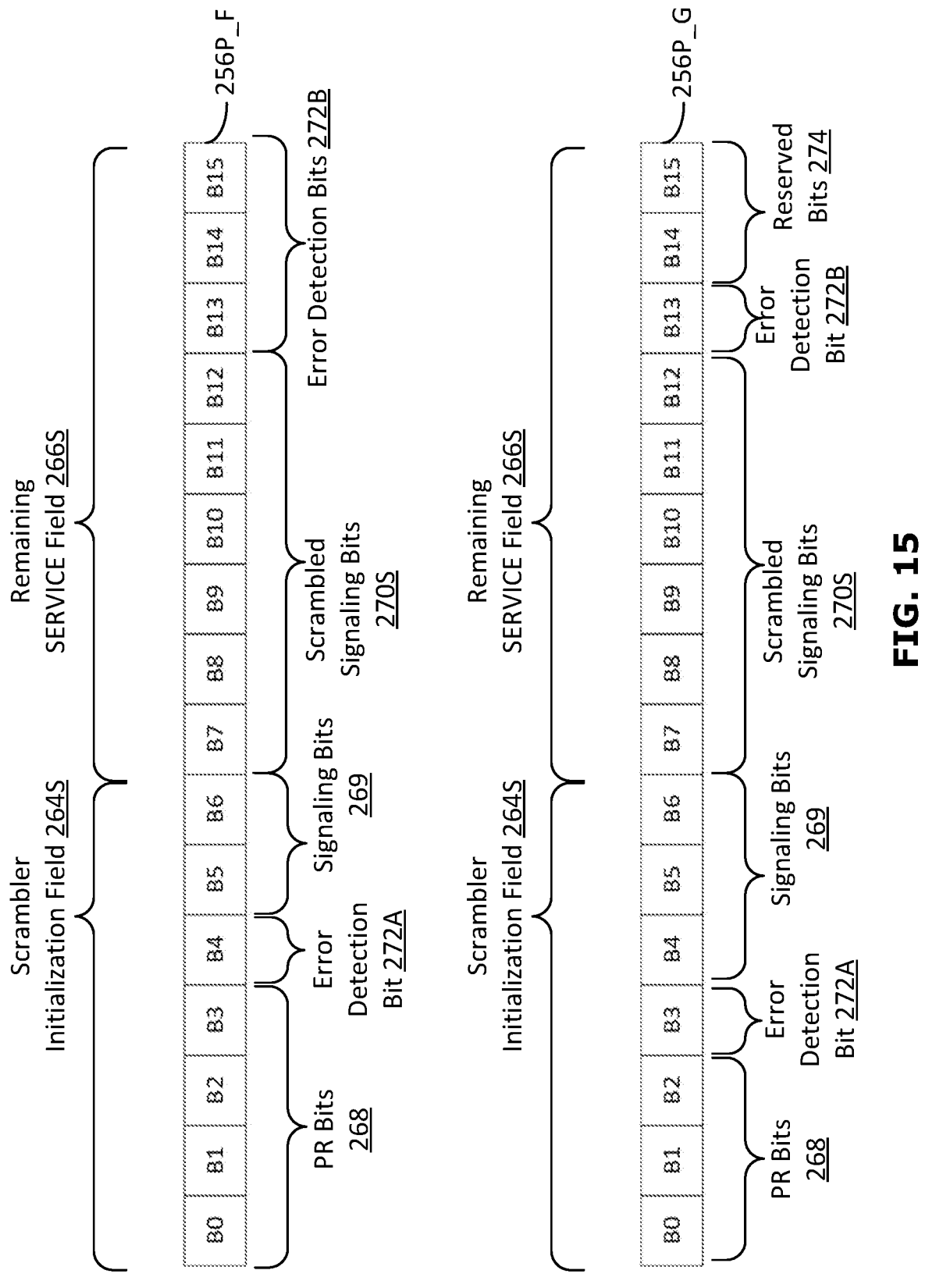
FIG. 15 illustrates further example formats of a SERVICE field of the DATA field of the data unit frame structure of FIG. 2.

In further examples of the present disclosure, a first set of one or more error protection bits are used to protect a first group of designated bits included in the scrambler initialization field 264S of the protected SERVICE field 256P and a second set of one or more error protection bits are used to protect a second group of designated bits included in the remaining initialization bits 266S of the SERVICE field 256, as will now be explained with reference to FIGS. 15 and 16. FIG. 15 shows examples of alternative formats 256P_F and 256P_G of a protected SERVICE field 256P for a Non-HT PPDU 250. Protected SERVICE field format 256P_F is similar to the SERVICE field format 256P_D in that error protection for four PR bits 268 in bit locations B0 to B3 and two Signaling bits 269 in bit location B5-B6 is provided by a single error detection bit (first error detection bit 272A) that is assigned bit location B4. First error detection bit 272A is a parity check bit that is computed based on the content of PR bits 268 and Signaling bits 269. However, in addition to the first error detection bit 272A that protects PR bits 268 and signaling bits 269 of the scrambler initialization field 264S, a second set of error detection bits 272B are assigned bit locations B13 to B15 of the scrambled remaining service field 266S. The second set of error detection bits 272B can be CRC-3 bits that are determined based on the content of scrambled signaling bits 270S that are included in bit locations B7 to B12 of the scrambled remaining SER-VICE field 266S.

Protected SERVICE field format 256P_G is similar to the protected SERVICE field format 256P_E in that error protection for three PR bits 268 in bit locations B0 to B2 and three Signaling bits 269 in bit location B4-B6 is provided by a single error detection bit (first error detection bit 272A) that is assigned bit location B4. First error detection bit 272A is a parity check bit that is computed based on the content of PR bits 268 and Signaling bits 269. However, in addition to the first error detection bit 272A that protects unscrambled PR bits 268 and Signaling bits 269 included in the scrambler initialization field 264S, a second error detection bit 272 is assigned bit location B13 in the scrambled remaining service bit field 266S. The second error detection bit 272B can be a parity bit that is determined based on the content of scrambled signaling bits 270S that are included in bit locations B7 to B12 of the scrambled remaining SER-VICE bit field 266S.

In the case of protected SERVICE field formats 256P_F and 256P_G, the first error detection bit(s) 272A can be computed either before or after scrambling. Second error detection bit(s) 272B is (are) determined after scrambling. In some examples, second error detection bit(s) 272B may also be determined before scrambling.

Figure 16:
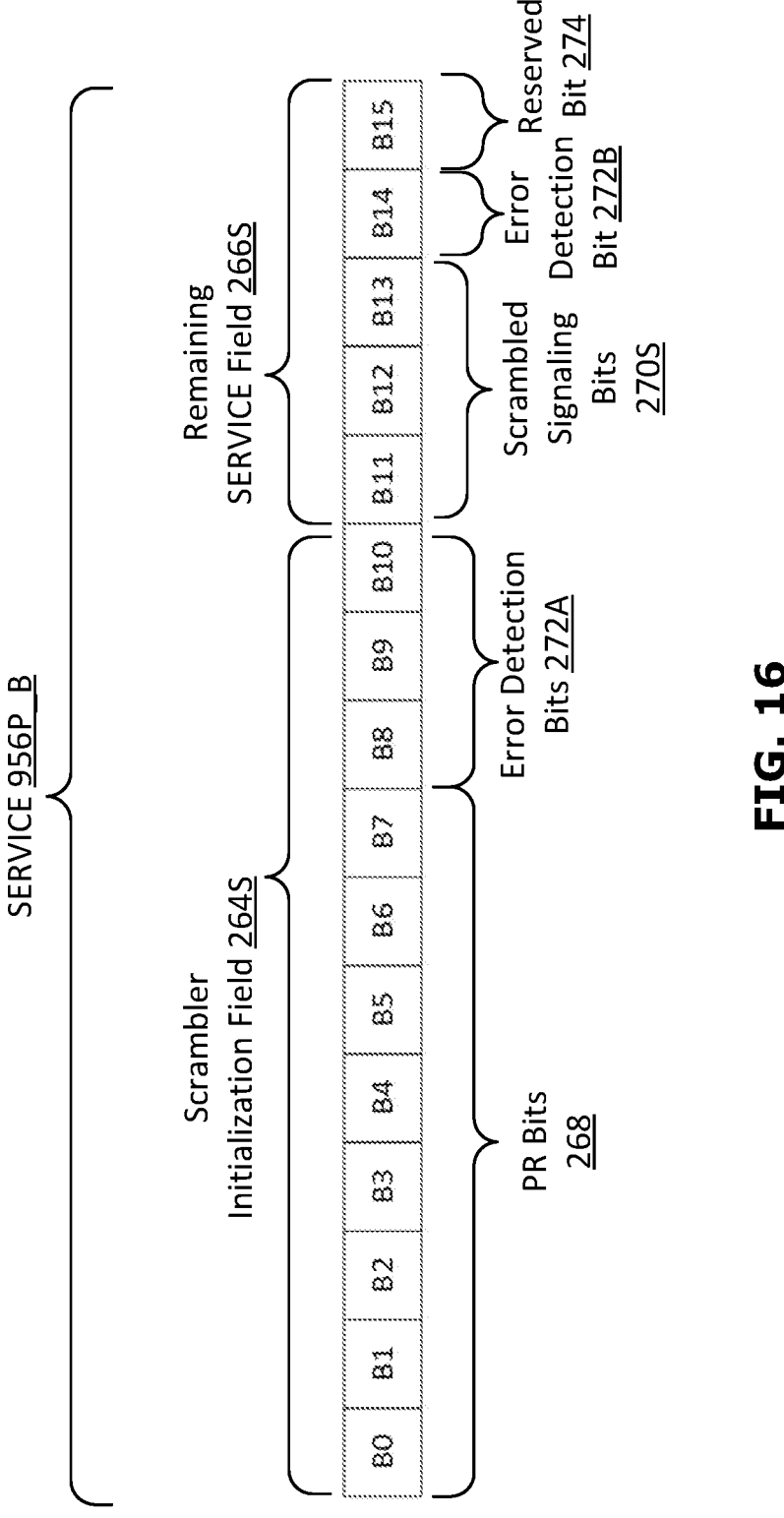
FIG. 16 illustrates a further example format of a SERVICE field of the DATA field of the data unit frame structure of FIG. 9.

FIG. 16 shows examples of an alternative format of a protected SERVICE field format 956P_B for an EHT PPDU 950. Protected SERVICE field format 956P_B is similar to the protected SERVICE field format 956P_A in that error protection for the eight (8) PR bits 268 in bit locations B0 to B7 is provided by a set of error detection bits (first error detection bits 272A) that are assigned bit locations B8 to B10 within the scrambler initialization field 264S. First error detection bits 272A can be a CRC-3 error detection value that is computed based on the content of PR bits 268. However, in addition to the first error detection bits 272A that protect PR bits 268, a second error detection bits 272B is assigned bit location B14 of the scrambled remaining SERVICE field 266S. The second error detection bit 272B can be a parity bit that is determined based on the content of scrambled signaling bits 270S that are included in bit locations B11 to B13 of the scrambled remaining SERVICE field 266S.

In the cases of each of the protected SERVICE field formats 256P_F, 256P_G, and 956P_B the first error detection bit(s) 272A can be computed either before or after scrambling. Second error detection bit(s) 272B is (are) determined after scrambling.

Figure 17:
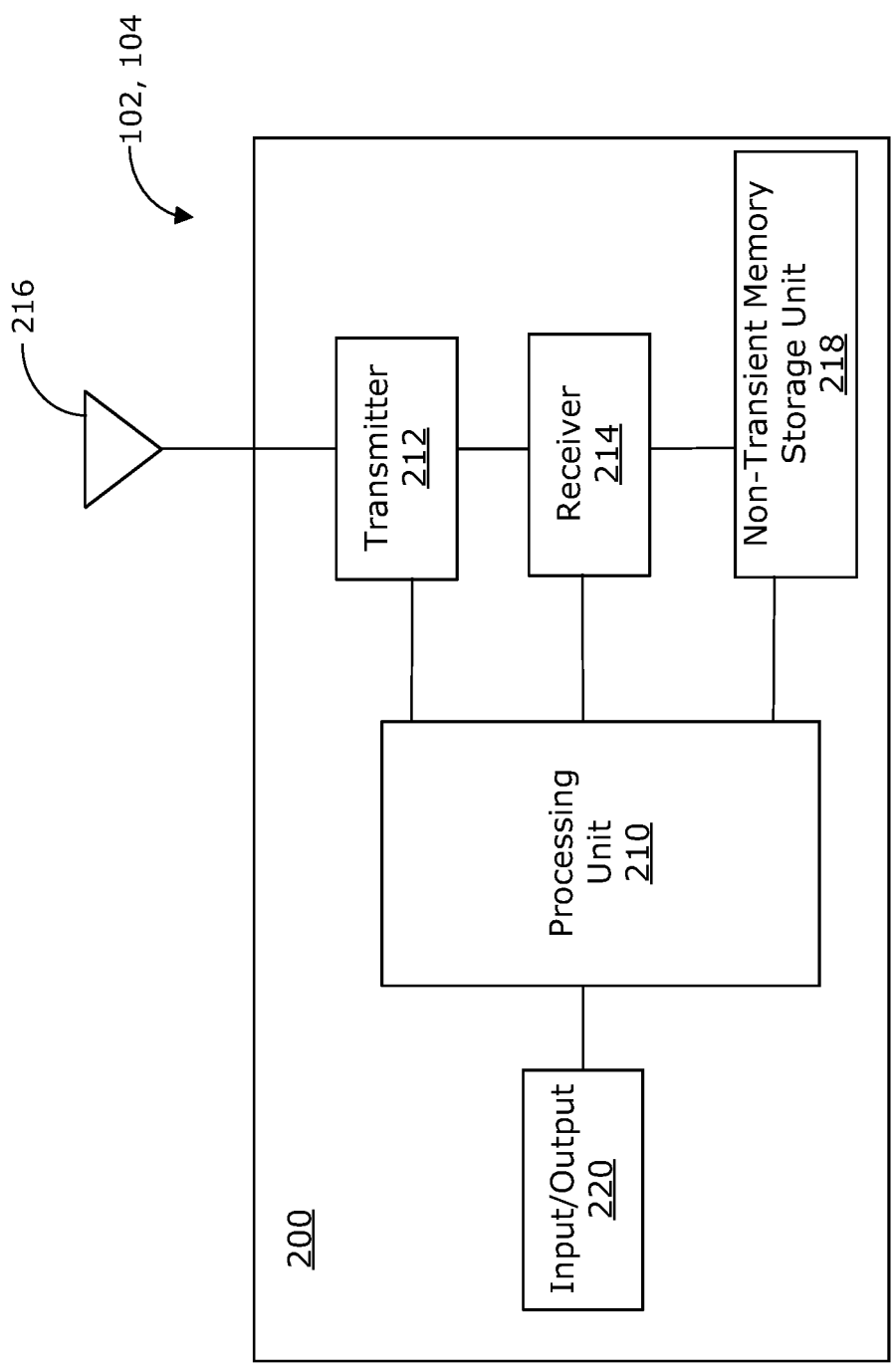
FIG. 17 illustrates an example wireless communication device that may act as an AP 102 or an STA 104 shown in FIG. 1.

FIG. 17 shows an example wireless communication device 200 that may be used to implement an AP 102 or an STA 104 shown in FIG. 1. The wireless communication device 200 includes at least one processing unit 210, at least one transmitter 212, at least one receiver 214, one or more antennas 216, electronic storage including at least one non-transitory memory storage unit 218, and one or more input/output (I/O) devices or interfaces 220.

The processing unit 210 implements various processing operations of AP 102 or the receiving (target) STA 104, such as signal coding, data processing, power control, input/output processing, or any other functionality. The processing unit 210 can also be configured to implement some or all of the functionality and/or embodiments described herein. Each processing unit 210 includes any suitable processing or computing device configured to perform one or more operations. Each processing unit 210 can, for example, include a microprocessor, microcontroller, digital signal processor, field-programmable gate array, or application-specific integrated circuit. The processing unit 210, being operably connected to the I/O interfaces 220, transmitter 212 and receiver 214, may be configured to generate wireless signals based on signals received from input 220 for transmission by the transmitter 212 or to process wireless signals received from receiver 214. In some embodiments that communicate OFDM signals or OFDMA signals, the processing unit 210 may be configured to generate OFDM or OFDMA signals that are suitable for transmission by, for example, performing an inverse fast Fourier transform (IFFT) or any other suitable processing technique. The processing unit 210 may also be configured to process received OFDM signals or OFDMA signals by, for example, performing a Fast Fourier Transform (FFT) or any other suitable processing technique. In some embodiments, the processing unit 210 may be configured to detect the presence of an OFDM signal or OFDMA signal by performing a correlation or cross-correlation to detect a preamble. The preambles may be part of a predetermined frame structure for Wi-Fi communication. Although a single instance of a processing unit 210 is shown, it is understood that multiple instances of the processing unit 210 may be present in each wireless communication apparatus. For example, there may be at least one processing unit for processing output signals to be transmitted by the transmitter 212 and at least one processing unit for processing input signals from the receiver 214.

Transmitter 212 may include any suitable structure for generating signals for wireless or wired transmission. Each receiver 214 may include any suitable structure for processing signals received wirelessly or by wire. Each transmitter 212 and receiver 214 can include associated amplification and modulation/demodulation circuitry. Although shown as separate components, at least one transmitter 212 and at least one receiver 214 may be combined into a single transceiver. Each antenna 216 may include any suitable structure for transmitting and/or receiving wireless or wired signals. Although a common antenna 216 is shown here as being coupled to both the transmitter 212 and the receiver 214, one or more antennas 216 could be coupled to one or more transmitter(s) 212, and one or more separate antennas 216 could be coupled to one or more receiver(s) 214. In some examples, one or more antennas 216 may be an antenna array, which may be used for beamforming and beam steering operations. Each non-transitory memory storage unit 218 may include any suitable volatile and/or non-volatile storage and retrieval device(s). Any suitable type of memory may be used, such as random access memory (RAM), read-only memory (ROM), hard disk, optical disc, subscriber identity module (SIM) card, memory stick, secure digital (SD) memory card, and the like. The non-transitory memory storage unit 218 may store instructions and data used, generated, or collected by AP 102 or STA 104. For example, the non-transitory memory storage unit 218 could store software instructions or modules configured to implement some or all of the functionality and/or embodiments described herein and that are executed by the processing unit(s) 210.

The input/output device/interface 220 may permit interaction with a user or other devices in the network. The input/output device/interface 220 includes any suitable structure for providing information to or receiving/providing information from a user, including network interface communications.

The embodiments set forth herein represent information sufficient to practice the claimed subject matter and illustrate ways of practicing such subject matter. Upon reading the above description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for transmitting data in a wireless local area network (WLAN), comprising:
transmitting, in the WLAN, from a first wireless communication device, an RF signal that carries a data unit, the data unit comprising a DATA field that includes a SERVICE field, the SERVICE field including a scrambler initialization field and a sequence of remaining bits scrambled based on a set of scrambler sequence initialization bits included in the scrambler initialization field, the SERVICE field containing a first set of one or more error detection bits that has been computed based on a first group of bits included in the scrambler initialization field and a second group of bits in the sequence of remaining scrambled bits in the SERVICE field only, to enable error detection only for the first group of bits included in the scrambler initialization field and the second group of bits in the sequence of remaining scrambled bits in the SERVICE field.

2. The method of claim 1 wherein the first set of one or more error detection bits are included in the sequence of scrambler sequence initialization bits.

3. The method of claim 2 comprising, prior to transmitting the RF signal, computing the first set of one or more error detection bits and then scrambling the bits included in the sequence of remaining bits based on the scrambler sequence initialization bits.

4. The method of claim 3 wherein the sequence of remaining bits comprises a second set of one or more error detection bits that have been computed to enable error detection for a second group of bits that are included in the sequence of remaining bits.

5. The method of claim 1 wherein the first set of one or more error detection bits are included in the sequence of remaining bits.

6. The method of claim 5 comprising, prior to transmitting the RF signal, computing the first set of one or more error detection bits based on further bits included in the SERVICE field in addition to the first group of bits.

7. The method of claim 6 wherein the further bits include signaling bits that indicate channel bandwidth information.

8. The method of claim 6 wherein the further bits include signaling bits that indicate a puncturing pattern.

9. The method of claim 5 wherein the further bits include signaling bits that are located within the scrambler initialization field following the first group of bits.

10. The method of claim 5 wherein the further bits include signaling bits that are located within the sequence of remaining bits of the SERVICE field.

11. The method of claim 1 wherein the SERVICE field is 16 bits, the scrambler initialization field is 7 bits and the sequence of remaining bits is 9 bits.

12. The method of claim 11 wherein the data unit is a Non-High-Throughput physical layer (PHY) protocol data unit (PPDU).

13. The method of claim 1 wherein the SERVICE field is 16 bits, the scrambler initialization field is 11 bits and the sequence of remaining bits is 5 bits.

14. The method of claim 13 wherein the data unit is an Extremely-High-Throughput PPDU.

15. The method of claim 1 wherein the first set of one or more error detection bits is a set of error detection bits that provide a cyclic redundancy check (CRC) value.

16. The method of claim 1 wherein the first set one or more error detection bits is a single parity check value.

17. The method of claim 1 wherein the first group of bits are pseudorandom bits that are applied to initialize a polynomial scrambler function that scrambles all bits in the DATA field following the sequence of unscrambled scrambler initialization bits.

18. The method of claim 1 wherein the first set of one or more error detection bits includes a set of error detection and correction bits that have been computed to enable error detection and correction for the first group of bits included in the scrambler initialization field.

19. A wireless communication device comprising a processing device and memory storing instructions that when executed by the processing device cause the wireless communication device to:

transmit and/or receive, by a transceiver, an RF signal that carries a data unit, the data unit comprising a DATA field that includes a SERVICE field, the SERVICE field including a scrambler initialization field and a sequence of remaining bits scrambled based on a set of scrambler sequence initialization bits included in the scrambler initialization field, the SERVICE field containing a first set of one or more error detection bits that has been computed based on a first group of bits included in the scrambler initialization field and a second group of bits in the sequence of remaining scrambled bits in the SERVICE field only, to enable error detection only for the first group of bits included in the scrambler initialization field and the second group of bits in the sequence of remaining scrambled bits in the SERVICE field.

20. A method for receiving data in a wireless local area network (WLAN), comprising:

receiving, at a wireless communication device, an RF signal that carries a data unit, the data unit comprising a DATA field that includes a SERVICE field, the SERVICE field including a scrambler initialization field and a sequence of remaining bits scrambled based on a set of scrambler sequence initialization bits included in the scrambler initialization field, the SERVICE field containing a first set of one or more error detection bits that has been computed based on a first group of bits included in the scrambler initialization field and a second group of bits in the sequence of remaining scrambled bits in the SERVICE field only, to enable error detection only for the first group of bits included in the scrambler initialization field and the second group of bits in the sequence of remaining scrambled bits in the SERVICE field.

* * * * *